US012586525B2

(12) United States Patent
Cong et al.

(10) Patent No.: US 12,586,525 B2
(45) Date of Patent: Mar. 24, 2026

(54) PIXEL DRIVING CIRCUIT WITH DRIVING CURRENT CONTROLLED BY DIGITAL SIGNALS FOR GRAYSCALE CONTROL, DISPLAY DEVICE AND DISPLAY METHOD

(71) Applicants: BEIJING BOE DISPLAY TECHNOLOGY CO., LTD., Beijing (CN); BOE TECHNOLOGY GROUP CO., LTD., Beijing (CN); Beijing BOE Technology Development Co., Ltd., Beijing (CN)

(72) Inventors: Ning Cong, Beijing (CN); Can Zhang, Beijing (CN); Minghua Xuan, Beijing (CN); Jinfei Niu, Beijing (CN); Can Wang, Beijing (CN); Jingjing Zhang, Beijing (CN); Jiakui Yan, Beijing (CN)

(73) Assignees: BEIJING BOE DISPLAY TECHNOLOGY CO., LTD., Beijing (CN); BOE TECHNOLOGY GROUP CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/659,648

(22) Filed: May 9, 2024

(65) Prior Publication Data

US 2024/0331634 A1 Oct. 3, 2024

Related U.S. Application Data

(63) Continuation of application No. PCT/CN2023/091474, filed on Apr. 28, 2023.

(30) Foreign Application Priority Data

Mar. 28, 2023 (WO) ................ PCT/CN2023/084368

(51) Int. Cl.
*G09G 3/30* (2006.01)
*G09G 3/20* (2006.01)
*G09G 3/3233* (2016.01)

(52) U.S. Cl.
CPC ......... *G09G 3/3233* (2013.01); *G09G 3/2074* (2013.01); *G09G 2300/0814* (2013.01);
(Continued)

(58) Field of Classification Search
CPC ............... G09G 3/2074; G09G 3/3233; G09G 2300/0814; G09G 2300/0852; G09G 2320/0233
See application file for complete search history.

(56) References Cited

U.S. PATENT DOCUMENTS

2014/0333677 A1 11/2014 Kim
2019/0130838 A1* 5/2019 Miyasaka ............ G09G 3/3258
(Continued)

FOREIGN PATENT DOCUMENTS

CN 102360539 A 2/2012
CN 110010057 A 7/2019
(Continued)

OTHER PUBLICATIONS

Written Opinion and International Searh Report dated Dec. 11, 2023, issued in counterpart to CN Application No. PCT/CN2023/084368. (11 pages).

*Primary Examiner* — Sanghyuk Park
(74) *Attorney, Agent, or Firm* — WHDA, LLP

(57) ABSTRACT

A pixel driving circuit includes a first circuit and a second circuit. The first circuit is configured to provide a driving current to a light emitting element under the control of the second circuit; the second circuit is configured to receive a digital selection signal from at least one digital selection signal line, receive a digital data signal from at least one
(Continued)

digital data signal line, and control a frequency and duration of the driving current received by the light emitting element during one frame of image, thereby controlling tahe gray-scale of a sub-pixel having the light emitting element.

19 Claims, 15 Drawing Sheets

(52) U.S. Cl.
CPC ............... *G09G 2300/0852* (2013.01); *G09G 2300/0861* (2013.01); *G09G 2310/08* (2013.01); *G09G 2320/0233* (2013.01)

(56) References Cited

U.S. PATENT DOCUMENTS

| | | | | |
|---|---|---|---|---|
| 2019/0347990 | A1* | 11/2019 | Knez | G09G 3/2022 |
| 2020/0135774 | A1* | 4/2020 | Li | H10D 30/6731 |
| 2022/0084465 | A1* | 3/2022 | Yang | G09G 3/3233 |

FOREIGN PATENT DOCUMENTS

| | | | |
|---|---|---|---|
| CN | 110010072 | A | 7/2019 |
| CN | 110021264 | A | 7/2019 |
| CN | 110728946 | A | 1/2020 |
| CN | 111433839 | A | 7/2020 |
| CN | 112233607 | A | 1/2021 |
| CN | 114664248 | A | 6/2022 |
| CN | 115547233 | A | 12/2022 |
| WO | 2021/068254 | A1 | 4/2021 |

* cited by examiner

PIXEL DRIVING CIRCUIT WITH DRIVING CURRENT CONTROLLED BY DIGITAL SIGNALS FOR GRAYSCALE CONTROL, DISPLAY DEVICE AND DISPLAY METHOD

CROSS-REFERENCE TO RELATED APPLICATION

The present disclosure is the bypass continuation application of PCT Application No. PCT/CN2023/091474 filed on Apr. 28, 2023, which claims the priority of the PCT Application No. PCT/CN2023/084368 filed on Mar. 28, 2023, which are incorporated herein by reference in their entireties.

TECHNICAL FIELD

The present disclosure relates to the field of display technology, in particular to a pixel driving circuit, a display device and a display method.

BACKGROUND

Augmented reality display devices have been developed recently, in which optical waveguide technology is often used to achieve miniaturized structures. Due to the relatively large optical loss in optical waveguides, higher display brightness is usually required to adapt to the use of optical waveguides. Organic light emitting diodes have many advantages but have relatively low brightness. On the other hand, inorganic light emitting diode display panels such as micro light emitting diode display panels or mini light emitting diode display panels have relatively high light emitting intensity and are particularly suitable for augmented reality displays. Augmented reality display devices typically require 5,000 pixels per inch or higher, which means pixel pitches of 5 microns or less.

SUMMARY

In one aspect, the present disclosure provides in some embodiments a pixel driving circuit, comprising a first circuit and a second circuit; wherein, the first circuit is configured to provide a driving current to a light emitting element under the control of the second circuit; the second circuit is configured to: receive a digital selection signal from at least one digital selection signal line, receive a digital data signal from at least one digital data signal line, and control a frequency and duration of the driving current received by the light emitting element during one frame of image, thereby controlling a grayscale of a sub-pixel having the light emitting element.

Optionally, the at least one digital data signal line includes a first digital data signal line and a second digital data signal line; the second circuit includes a latch, a first transistor and a second transistor; gate electrodes of the first transistor and the second transistor are coupled to the digital selection signal line and configured to receive the digital selection signal from the digital selection signal line; a first electrode of the first transistor is coupled to the first digital data signal line and configured to receive a first digital data signal from the first digital data signal line; a second electrode of the first transistor is coupled to the latch; a first electrode of the second transistor is coupled to the second digital data signal line and configured to receive a second digital data signal from the second digital data signal line; and a second electrode of the second transistor is coupled to the latch.

Optionally, the second circuit includes a latch, a first transistor and a second transistor; the latch includes a third transistor, a fourth transistor, a fifth transistor and a sixth transistor; gate electrodes of the fourth transistor and the sixth transistor are coupled to a first latch node in the second circuit, and the first latch node is coupled to a second electrode of the first transistor; gate electrodes of the third transistor and the fifth transistor are coupled to a second latch node, and the second latch node is coupled to a second electrode of the second transistor; second electrodes of the third transistor and the fifth transistor are coupled to the first latch node, and the first latch node is coupled to gate electrodes of the fourth transistor and the sixth transistor; second electrodes of the fourth transistor and the sixth transistor are coupled to the second latch node in the second circuit, the second latch node is coupled to the gate electrode of the third transistor and the gate electrode of the fifth transistor; first electrodes of the third transistor and the fourth transistor are coupled to a voltage supply signal line and configured to receive a voltage supply signal from the voltage supply signal line; and first electrodes of the fifth transistor and the sixth transistor are coupled to a low voltage signal line and configured to receive a low voltage signal from the low voltage signal line.

Optionally, the second circuit further includes a seventh transistor and an eighth transistor; gate electrodes of the seventh transistor and the eighth transistor are coupled to the first latch node; second electrodes of the seventh transistor and the eighth transistor are coupled to the gate electrode of the light emitting control transistor in the first circuit; a first electrode of the seventh transistor is coupled to the voltage supply signal line; a first electrode of the eighth transistor is coupled to the low voltage signal line.

Optionally, the at least one digital selection signal line includes a first digital selection signal line; the second circuit includes a latch and a first transistor; a gate electrode of the first transistor is coupled to the first digital selection signal line and is configured to receive a first digital selection signal from the first digital selection signal line; a first electrode of the first transistor is coupled to the digital data signal line and configured to receive the digital data signal from the digital data signal line; a second electrode of the first transistor is coupled to the latch.

Optionally, the at least one digital selection signal line further includes a second digital selection signal line; the second circuit further includes a second transistor; a gate electrode of the second transistor is coupled to the second digital selection signal line and is configured to receive a second digital selection signal from the second digital selection signal line; a first electrode of the second transistor is coupled to the digital data signal line and configured to receive the digital data signal from the digital data signal line; a second electrode of the second transistor is coupled to the latch.

Optionally, the latch includes: a ninth transistor, a tenth transistor, an eleventh transistor and a twelfth transistor; gate electrodes of the ninth transistor and the tenth transistor are coupled to a first latch node in the second circuit, and the first latch node is coupled to a second electrode of the first transistor; a first electrode of the ninth transistor and a first electrode of the eleventh transistor are coupled to the voltage supply signal line, and a second electrode of the ninth transistor is coupled to a second electrode of the tenth transistor, and coupled to a gate electrode of the eleventh transistor and a gate electrode of the twelfth transistor; a second electrode of the eleventh transistor is coupled to a second electrode of the twelfth transistor and coupled to the first latch node; a first electrode of the tenth transistor and a first electrode of the twelfth transistor are coupled to a low voltage signal line and configured to receive a low voltage signal from the low voltage signal line.

Optionally, the first circuit includes a first sub-circuit, a second sub-circuit and a third sub-circuit; the third sub-circuit is coupled to the second sub-circuit, to the light emitting element, and to a first latch node in the second circuit; and a voltage level at the first latch node is configured to control the third sub-circuit to allow or disallow the driving current from the second sub-circuit to pass through the third sub-circuit to reach the light emitting element.

Optionally, the first circuit includes a storage capacitor, a first sub-circuit, a second sub-circuit and a third sub-circuit; the first sub-circuit is coupled to a data line and a gate line and is configured to write a data signal to a first node; the second sub-circuit is coupled to the first node and configured to receive a voltage supply signal from a voltage supply signal line; and the second sub-circuit is coupled to the first sub-circuit and to the third sub-circuit; a first electrode of the storage capacitor is coupled to the first node.

Optionally, the first circuit includes a storage capacitor, a first sub-circuit, a second sub-circuit and a third sub-circuit; the first sub-circuit includes at least one data writing-in transistor; the second sub-circuit includes a driving transistor; the third sub-circuit includes a light emitting control transistor; a gate electrode of the light emitting control transistor is coupled to the first latch node in the second circuit; a first electrode of the light emitting control transistor is coupled to the second electrode of the driving transistor; and a second electrode of the light emitting control transistor is coupled to an anode of the light emitting element.

Optionally, a gate electrode of the data writing-in transistor is coupled to the gate line; a first electrode of the data writing-in transistor is coupled to the data line; a second electrode of the data writing-in transistor coupled to the first node; a gate electrode of the driving transistor is coupled to the first node; a first electrode of the driving transistor is coupled to the voltage supply signal line; and a second electrode of the driving transistor is coupled to the first electrode of the light emitting control transistor.

Optionally, the first circuit further includes a control transistor; a gate electrode of the control transistor is coupled to the gate line, a first electrode of the control transistor is coupled to the voltage supply signal line, and a second electrode of the control transistor is coupled to the first electrode of the driving transistor.

Optionally, the first circuit further includes an auxiliary capacitor; a first electrode of the storage capacitor is coupled to the first node, a second electrode of the storage capacitor is coupled to a second electrode of the auxiliary capacitor, the first electrode of the driving transistor and a second electrode of the control transistor; and a first electrode of the auxiliary capacitor is coupled to the voltage supply signal line, and the second electrode of the auxiliary capacitor is coupled to the second electrode of the storage capacitor, the first electrode of the driving transistor and the second electrode of the control transistor.

Optionally, the first circuit includes a storage capacitor, a first sub-circuit, a second sub-circuit and a third sub-circuit; the first sub-circuit includes a first data writing-in transistor and a second data writing-in transistor; the first data writing-in transistor is an n-type transistor, and the second data writing-in transistor is a p-type transistor; a gate electrode of the first data writing-in transistor is coupled to a first gate line and configured to receive a first gate driving signal from the first gate line; a gate electrode of the second data writing-in transistor is coupled to a second gate line and configured to receive a second gate driving signal from the second gate line; first electrodes of the first data writing-in transistor and the second data writing-in transistor are coupled to the data line; and second electrodes of the first data writing-in transistor and the second data writing-in transistor are coupled to the first node.

Optionally, the first circuit includes a storage capacitor, a first sub-circuit, a second sub-circuit and a third sub-circuit; the first sub-circuit is coupled to a first node and configured to write a data signal on a data line into a first node; the second sub-circuit is coupled to the first node and the light emitting element; the third sub-circuit is coupled to the second sub-circuit, to a voltage supply signal line, and to a first latch node in the second circuit; and the voltage level at the first latch node is configured to control the third sub-circuit to allow or disallow the second sub-circuit to provide a driving current to the light emitting element; a first electrode of the storage capacitor is coupled to the first node.

Optionally, the first sub-circuit includes at least one data writing-in transistor; the second sub-circuit includes a driving transistor, a gate electrode of the driving transistor is coupled to the first node, and a second electrode of the driving transistor is coupled to an anode of the light emitting element; the third sub-circuit includes a light emitting control transistor, a gate electrode of the light emitting control transistor is coupled to the first latch node in the second circuit, and a first electrode of the light emitting control transistor is coupled to the a voltage supply signal line, and a second electrode of the light emitting control transistor is coupled to the first electrode of the driving transistor.

Optionally, the at least one data writing-in transistor includes a first data writing-in transistor and a second data writing-in transistor; the first data writing-in transistor is an n-type transistor, and the second data writing-in transistor is a p-type transistor; a gate electrode of the first data writing-in transistor is coupled to a first gate line and configured to receive a first gate driving signal from the first gate line; a gate electrode of the second data writing-in transistor is coupled to a second gate line and configured to receive a second gate driving signal from the second gate line; first electrodes of the first data writing-in transistor and the second data writing-in transistor are coupled to the data line; and second electrodes of the first data writing-in transistor and the second data writing-in transistor are coupled to the first node.

Optionally, a frequency and duration of the driving current received by the light emitting element during a one frame of image are related to a frequency and duration of a valid voltage of the digital selection signal provided to the digital selection signal line during the one frame of image.

In a second aspect, an embodiment of the present disclosure provides a display device, including: a plurality of light emitting elements arranged in an array; wherein each light emitting element is in a sub-pixel; the sub-pixel is connected to the pixel driving circuit; and each light emitting element is a mini-light emitting diode or a micro-light emitting diode.

Optionally, the pixel driving circuit is located on a silicon-based substrate.

In a third aspect, an embodiment of the present disclosure provides a display method, including: providing a pixel driving circuit including a first circuit and a second circuit; providing, by the first circuit, a driving current to the light emitting element under the control of the second circuit; receiving, by the second circuit, a digital selection signal from at least one digital selection signal line and receiving a digital data signal from at least one digital data signal line; controlling, by the second circuit, a frequency and duration of the driving current received by the light emitting element during one frame of image, thereby controlling a gray scale of a sub-pixel having the light emitting element.

Optionally, the second circuit includes a latch, a first transistor and a second transistor; gate electrodes of the first transistor and the second transistor are coupled to the digital selection signal line and configured to receive a digital selection signal from the digital selection signal line; a first electrode of the first transistor is coupled to the first digital data signal line and configured to receive a first digital data signal from the first digital data signal line; a second electrode of the first transistor is coupled to the latch; a first electrode of the second transistor is coupled to the second digital data signal line and configured to receive a second digital data signal from the second digital data signal line; and a second electrode of the second transistor is coupled to the latch; wherein the display method also includes: turning on the first transistor by a gate on voltage provided by the digital select signal line, thereby allowing the first digital data signal from the first digital data signal line to be transmitted to the first latch node; turning on the second transistor by the gate on voltage provided by the digital select signal line, thereby allowing the second digital data signal from the second digital data signal line to be transmitted to the second latch node; and latching the first digital data signal and the second digital data signal by the latch.

Optionally, the at least one digital selection signal line includes a first digital selection signal line; the second circuit includes a latch and a first transistor; a gate electrode of the first transistor is coupled to the digital selection signal line and is configured to receive a digital selection signal from the digital selection signal line; a first electrode of the first transistor is coupled to the digital data signal line and configured to receive the digital data signal from the digital data signal line; a second electrode of the first transistor is coupled to the latch; wherein the display method also includes: turning on the first transistor by a gate on voltage provided by the first digital selection signal line, thereby allowing a digital data signal from the digital data signal line to be transmitted to the first latch node; latching the digital data signal by the latch.

Optionally, the at least one digital selection signal line further includes a second digital selection signal line; the second circuit further includes a second transistor; wherein a gate electrode of the second transistor is coupled to the second digital selection signal line and is configured to receive a second digital selection signal from the second digital selection signal line; a first electrode of the second transistor is coupled to the digital data signal line and configured to receive the digital data signal from the digital data signal line; a second electrode of the second transistor is coupled to the latch; wherein the display method also includes: turning on the second transistor by the gate on voltage provided by the second digital selection signal line, thereby allowing the digital data signal from the digital data signal line to be transmitted to the first latch node.

Optionally, the display method further includes: setting a voltage level at the first latch node to a valid voltage level; and allowing the driving current from the second sub-circuit in the first circuit to pass through the third sub-circuit in the first circuit to reach the light emitting element.

Optionally, the display method further includes: setting the voltage level at the first latch node to an invalid voltage level; and disallowing the driving current from the second sub-circuit in the first circuit to pass through the third sub-circuit in the first circuit to reach the light emitting element.

Optionally, the display method further includes, in the first phase, providing a turn-on voltage signal to at least a gate electrode of the data writing-in transistor through a gate line to turn on the data writing-in transistor, allowing a data signal provided by the data line to pass through the data writing-in transistor to write the data signal into the first node.

Optionally, the first sub-circuit includes a first data writing-in transistor and a second data writing-in transistor; the display method also includes, in the first phase, providing a turn-on voltage signal to the gate electrode of the first data writing-in transistor through the first gate line to turn on the first data writing-in transistor; providing a turn-on voltage signal to the gate electrode of the second data writing-in transistor through the second gate line to turn on the second data writing-in transistor; and allowing the data signal provided by the data line to pass through the first data writing-in transistor and the second data writing-in transistor respectively to write the data signal into the first node.

BRIEF DESCRIPTION OF THE DRAWINGS

The following drawings are examples for illustrative purposes only and are not intended to limit the scope of the present disclosure.

DETAILED DESCRIPTION

The present disclosure will now be described in more detail with reference to the following examples. It should be noted that the following description of some embodiments is for purposes of illustration and description only. It is not intended to be exhaustive or limited to the precise form disclosed.

In certain display scenarios such as augmented reality displays, higher display stability is required. For example, displays involved in wearable devices or outdoor sports have higher requirements for resisting external interference, but lower requirements for displaying grayscale. These display scenarios place high demands on stable and reliable pixel driving.

Accordingly, the present disclosure provides a pixel driving circuit, a display device, and a display method that substantially obviate one or more problems due to limitations and disadvantages of the related art. In one aspect, the present disclosure provides a pixel driving circuit. In some embodiments, the pixel driving circuit includes a first circuit and a second circuit. Optionally, the first circuit is configured to provide a driving current to the light emitting element under the control of the second circuit. Optionally, the second circuit is configured to: receive a digital selection signal from a digital selection signal line, receive a first digital data signal from a first digital data signal line, and receive a second digital data signal from a second digital data signal line; and control the frequency and duration of the driving current received by the light emitting element during one frame of image, thereby controlling the grayscale of the sub-pixel having the light emitting element.

Figure 1A:
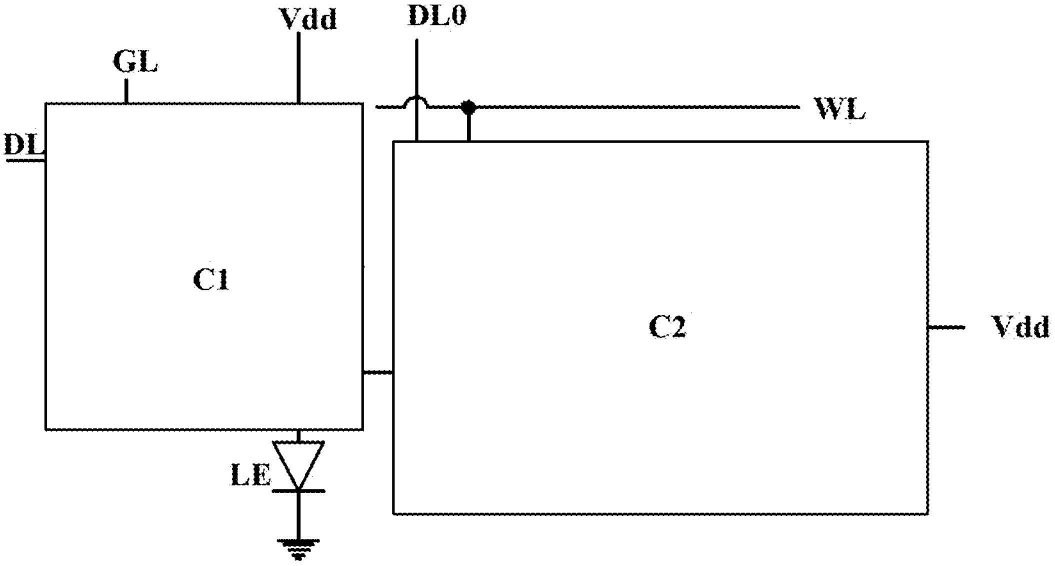
FIG. 1A is a schematic diagram illustrating the structure of a pixel driving circuit in some embodiments of the present disclosure.

FIG. 1A is a schematic diagram illustrating the structure of a pixel driving circuit in some embodiments of the present disclosure. Referring to FIG. 1A, in some embodiments, the pixel driving circuit includes a first circuit C1 and a second circuit C2, the first circuit C1 is configured to provide a driving current to the light emitting element LE, and the second circuit C2 is configured to control the frequency and duration of the driving current received by the light emitting element LE during one frame of image, thereby controlling the grayscale of the sub-pixel having the light emitting element LE.

Referring to FIG. 1A, in some embodiments, the first circuit C1 is configured to receive a gate driving signal from the gate line GL, a data signal from the data line DL, and a voltage supply signal from the voltage supply signal line Vdd.

Referring to FIG. 1A, in some embodiments, the second circuit C2 is configured to receive a digital selection signal from at least one digital selection signal line WL and a digital data signal from at least one digital data signal line DL0. Optionally, the second circuit C2 is further configured to receive the voltage supply signal from the voltage supply signal line Vdd.

In some embodiments, the first circuit C1 is coupled to the second circuit C2 and to the anode of the light emitting element LE. Optionally, the first circuit C1 is configured to provide a driving current to the light emitting element LE under the control of the second circuit C2. Alternatively, the frequency and duration at which the light emitting element LE receives the driving current during one frame of image are related to the frequency and duration of the effective voltage of the digital selection signal provided to the digital selection signal line WL during one frame of image.

Figure 1B:
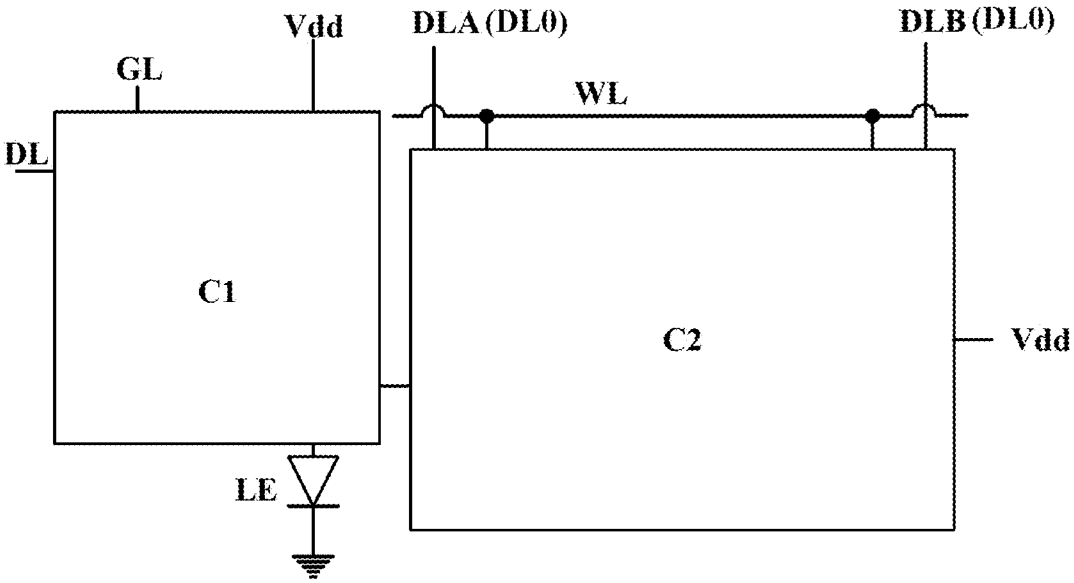
FIG. 1B is a schematic diagram illustrating the structure of a pixel driving circuit in some embodiments of the present disclosure.

FIG. 1B is a schematic diagram illustrating the structure of a pixel driving circuit in some embodiments according to the present disclosure. Referring to FIG. 1B, in some embodiments, the second circuit C2 is configured to receive a digital selection signal from a digital selection signal line WL, receive digital data signals from two digital data signal lines DL0. Specifically, the two digital data signal lines DL0 are respectively the first digital data signal line DLA and the second digital data signal line DLB; the second circuit C2 receives the first digital data signal from the first digital data signal line DLA, and receives the second digital data signal from the second digital data signal line DLB.

Figure 2:
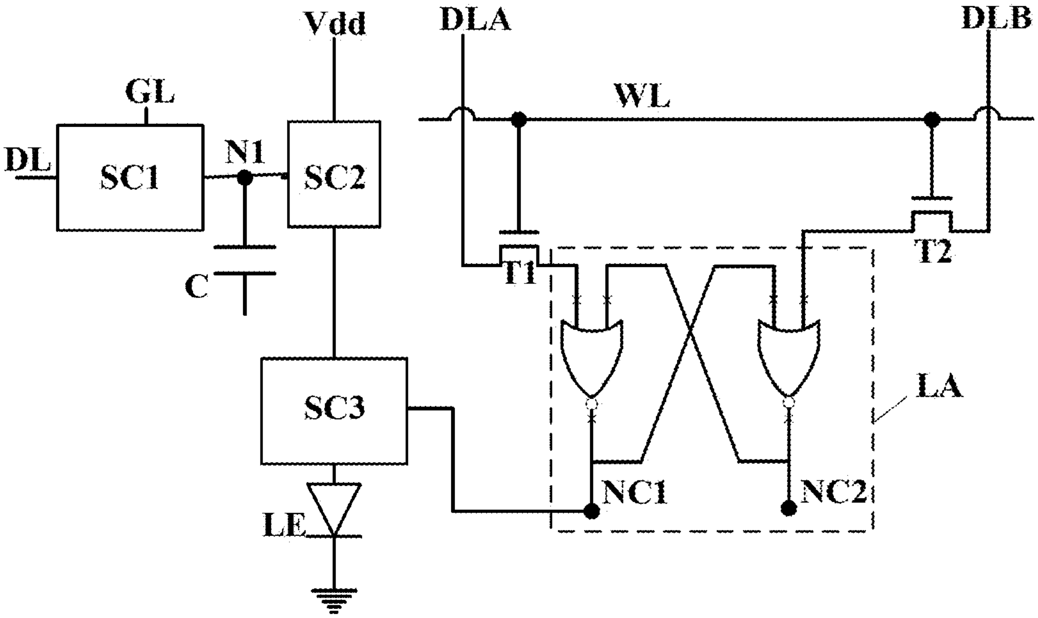
FIG. 2 is a schematic diagram showing the structure of a pixel driving circuit in some embodiments of the present disclosure.

FIG. 2 is a schematic diagram showing the structure of a pixel driving circuit in some embodiments of the present disclosure. Referring to FIG. 2, in some embodiments, the first circuit C1 includes a first sub-circuit SC1 coupled to the data line DL and the gate line. The first sub-circuit SC1 is configured to write a data signal into the first node N1.

In some embodiments, the first circuit C1 further includes a second sub-circuit SC2 coupled to the first node N1 and configured to receive the voltage supply signal from the voltage supply signal line Vdd. The second sub-circuit SC2 is configured to provide a driving current to the light emitting element LE. The second sub-circuit SC2 is coupled to the first sub-circuit SC1 and the third sub-circuit SC3.

In some embodiments, the first circuit C1 also includes a storage capacitor C. The first electrode of the storage capacitor C is coupled to the first node N1.

In some embodiments, the first circuit C1 further includes a third sub-circuit SC3 coupled to the second sub-circuit SC2, coupled to the light emitting element LE and coupled to the second circuit.

In some embodiments, the second circuit C2 includes a latch LA, a first transistor T1 and a second transistor T2. Optionally, latch LA is a bistable latch. The gate electrodes of the first transistor T1 and the second transistor T2 are coupled to the digital selection signal line WL, and are configured to receive the digital selection signal from the digital selection signal line WL. The first electrode of the first transistor T1 is coupled to the first digital data signal line DLA and is configured to receive the first digital data signal from the first digital data signal line DLA. The second electrode of the first transistor T1 is coupled to the latch LA. The first electrode of the second transistor T2 is coupled to the second digital data signal line DLB and is configured to receive the second digital data signal from the second digital data signal line DLB. The second electrode of the second transistor T2 is coupled to the latch LA.

In some embodiments, first latch node NC1 is coupled to third sub-circuit SC3. The voltage level at the first latch node NC1 is configured to control the third sub-circuit SC3 to allow or not allow the driving current from the second sub-circuit SC2 to reach the light emitting element LE through the third sub-circuit SC3.

The present disclosure may be implemented in pixel driving circuits with various types of transistors, including pixel driving circuits with p-type transistors, pixel driving circuits with n-type transistors, and pixel driving circuits with one or more p-type transistors and one or more n-type transistors. FIG. 2 shows an example in which the first transistor T1 and the second transistor T2 are n-type transistors. However, the present disclosure can be implemented in a pixel driving circuit having the first transistor T1 and the second transistor T2 of p-type transistors.

In one example, the transistor is an n-type transistor. The gate-on voltage of the n-type transistor may be set to a high level, and the gate-off voltage of the n-type transistor may be set to a low level.

In another example, the transistor is a p-type transistor. The gate-on voltage of the p-type transistor may be set to a low level, and the gate-off voltage of the p-type transistor may be set to a high level.

In some embodiments, the first transistor T1 is turned on by the gate-on voltage provided by the digital selection signal line WL, thereby allowing the first digital data signal from the first digital data signal line DLA to be transmitted to the first latch node NC1. The second transistor T2 is turned on by the gate-on voltage provided by the digital selection signal line WL, thereby allowing the second digital data signal from the second digital data signal line DLB to be transmitted to the second latch node NC2. The first digital data signal and the second digital data signal are latched by the latch LA. When the voltage level at the first latch node NC1 is a valid voltage level (e.g., a high voltage level), the third sub-circuit SC3 allows the driving current from the second sub-circuit SC2 to arrive the light emitting element LE through the third sub-circuit SC3. When the voltage level at the first latch node NC1 is an invalid voltage level (e.g., a low voltage level), the third sub-circuit SC3 does not allow the driving current from the second sub-circuit SC2 to arrive the light emitting element LE through the third sub-circuit SC3.

Figure 3A:
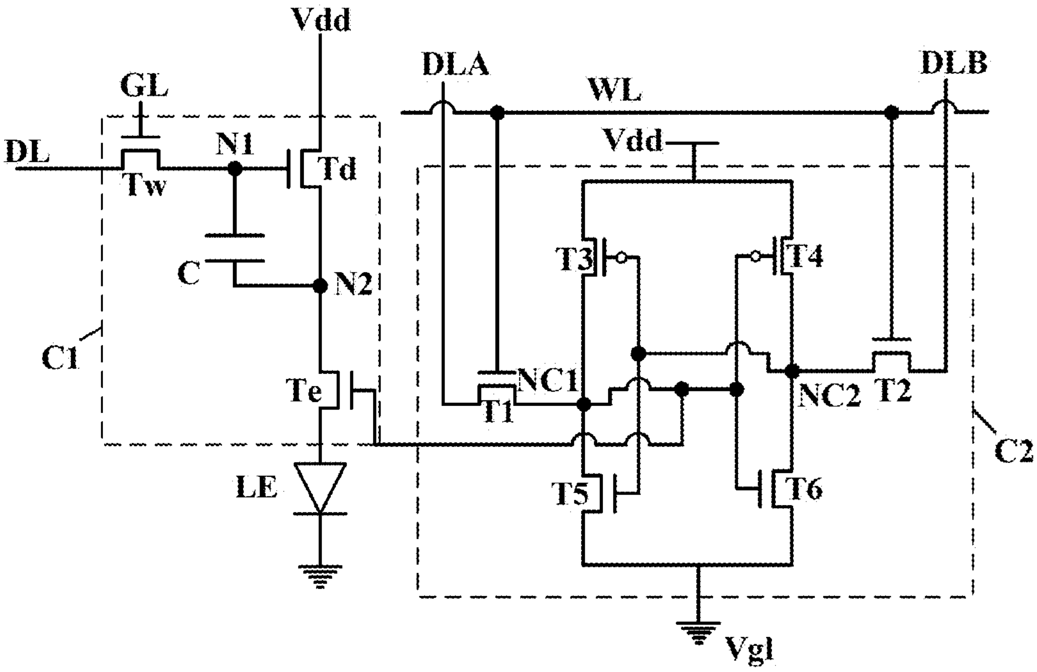
FIG. 3A is a schematic diagram illustrating the structure of a pixel driving circuit in some embodiments of the present disclosure.

The present disclosure may be implemented in a pixel driving circuit having various types of first circuits including 3T1C, 2T1C, 4T1C, 4T2C, 5T2C, 6T1C, 7T1C, 7T2C, 8T1C, and 8T2C circuits. FIG. 3A is a schematic diagram illustrating the structure of a pixel driving circuit in some embodiments of the present disclosure. Referring to FIG. 3A, the first circuit C1 is a 3T1C circuit. In some embodiments, referring to FIGS. 2 and 3A, the first sub-circuit SC1 includes a data writing-in transistor Tw, the second sub-circuit SC2 includes a driving transistor Td, and the third sub-circuit SC3 includes a light emitting control transistor Te.

The gate electrode of the data writing-in transistor Tw is coupled to the gate line GL, the first electrode of the data writing-in transistor Tw is coupled to the data line DL, and the second electrode of the data writing-in transistor Tw is coupled to the first node N1.

The gate electrode of the driving transistor Td is coupled to the first node N1. The first electrode of the driving transistor Td is coupled to the voltage supply signal line Vdd. The second electrode of the driving transistor Td is coupled to the second node N2.

The first electrode of the storage capacitor C is coupled to the first node N1. The second electrode of the storage capacitor C is coupled to the second node N2.

The gate electrode of the light emitting control transistor Te is coupled to the first latch node NC1. The first electrode of the light emitting control transistor Te is coupled to the second electrode of the driving transistor Td. The second electrode of the light emitting control transistor Te is coupled to the anode of the light emitting element LE.

The present disclosure can be implemented in pixel driving circuits with various types of latches. Referring to FIG. 3A, in some embodiments, the latch includes a third transistor T3, a fourth transistor T4, a fifth transistor T5, and a sixth transistor T6. In the example shown in FIG. 3A, the third transistor T3 and the fourth transistor T4 are p-type transistors; the first transistor T1, the second transistor T2, the fifth transistor T5 and the sixth transistor T6 are n-type transistors. The present disclosure may be implemented in pixel driving circuits with various types of transistors, including pixel driving circuits with p-type transistors, pixel driving circuits with n-type transistors, and pixel driving circuits with one or more p-type transistors and one or more n-type transistors. For example, the present disclosure may be implemented in a case where the third transistor T3 and the fourth transistor T4 are n-type transistors.

The gate electrodes of the fourth transistor T4 and the sixth transistor T6 are coupled to the first latch node NC1, which is coupled to the second electrode of the first transistor T1.

The gate electrodes of the third transistor T3 and the fifth transistor T5 are coupled to the second latch node NC2, and the second latch node NC2 is coupled to the second electrode of the second transistor T2.

The second electrodes of the third and fifth transistors T3 and T5 are coupled to the first latch node NC1, which is coupled to the gate electrodes of the fourth and sixth transistors T4 and T6.

The second electrodes of the fourth and sixth transistors T4 and T6 are coupled to the second latch node NC2, which is coupled to the gate electrodes of the third and fifth transistors T3 and T5.

The first electrodes of the third transistor T3 and the fourth transistor T4 are coupled to the voltage supply signal line Vdd, and are configured to receive the voltage supply signal from the voltage supply signal line Vdd.

The first electrodes of the fifth and sixth transistors T5 and T6 are coupled to the low voltage signal line Vgl, and are configured to receive the low voltage signal from the low voltage signal line Vgl.

Figure 3B:
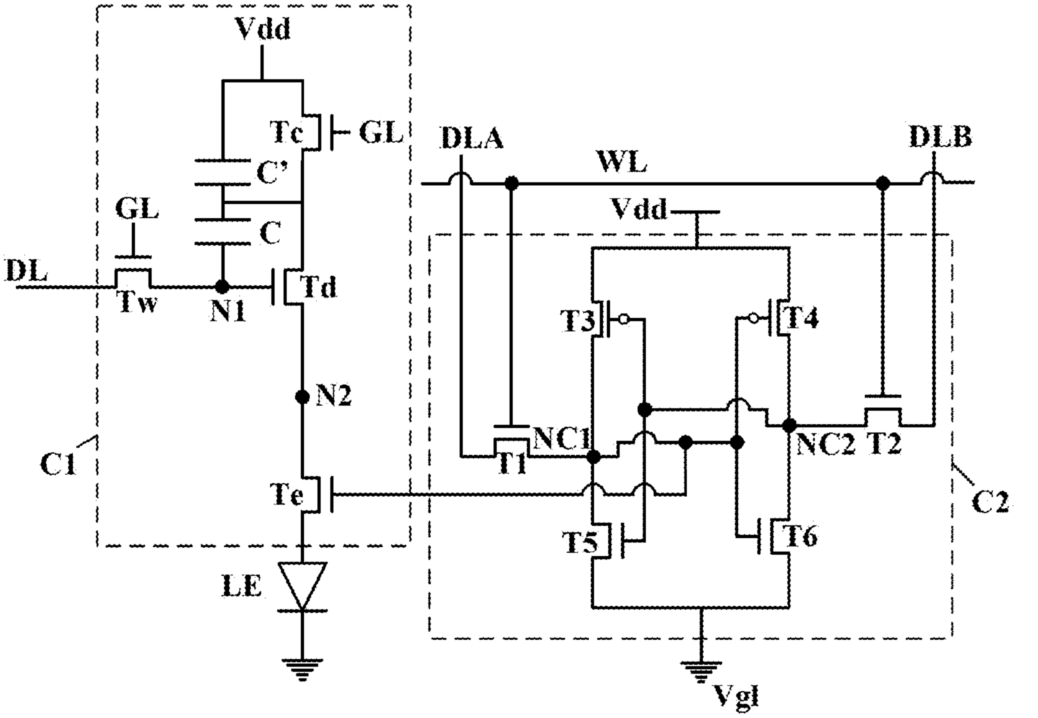
FIG. 3B is a schematic diagram illustrating the structure of a pixel driving circuit in some embodiments of the present disclosure.

FIG. 3B is a schematic diagram illustrating the structure of a pixel driving circuit in some embodiments of the present disclosure. Referring to FIG. 3B, the first circuit C1 is a 4T2C circuit. In some embodiments, referring to FIGS. 2 and 3B, the first sub-circuit SC1 includes a data writing-in transistor Tw, the second sub-circuit SC2 includes a driving transistor Td and a control transistor Tc, and the third sub-circuit SC3 includes a light emitting control transistor Te. The pixel driving circuit includes a storage capacitor C and an auxiliary capacitor C'.

The gate electrode of the data writing-in transistor Tw is coupled to the gate line GL, the first electrode of the data writing-in transistor Tw is coupled to the data line DL, and the second electrode of the data writing-in transistor Tw is coupled to the first node N1.

The gate electrode of the driving transistor Td is coupled to the first node N1. The first electrode of the driving transistor Td is coupled to the second electrode of the control transistor Tc, the second electrode of the storage capacitor C, and the second electrode of the auxiliary capacitor C'. The second electrode of the driving transistor Td is coupled to the second node N2.

The gate electrode of the control transistor Tc is coupled to the gate line GL, and the first electrode of the control transistor Tc is coupled to the voltage supply signal line Vdd. The second electrode of the control transistor Tc is coupled to the first electrode of the driving transistor Td.

The first electrode of the storage capacitor C is coupled to the first node N1. The second electrode of the storage capacitor C is coupled to the second electrode of the auxiliary capacitor C', the first electrode of the driving transistor Td, and the second electrode of the control transistor Tc.

The first electrode of the auxiliary capacitor C' is coupled to the voltage supply signal line Vdd. The second electrode of the auxiliary capacitor C' is coupled to the second electrode of the storage capacitor C, the first electrode of the driving transistor Td, and the second electrode of the control transistor Tc.

The gate electrode of the light emitting control transistor Te is coupled to the first latch node NC1. The first electrode of the light emitting control transistor Te is coupled to the second electrode of the driving transistor Td. The second electrode of the light emitting control transistor Te is coupled to the anode of the light emitting element LE.

In the present disclosure, the auxiliary capacitor C' and the control transistor Tc enable the first circuit C1 to output a more stable driving current. The existence of the storage capacitor and the auxiliary capacitor can effectively compensate the threshold voltage of the driving transistor Td and improve display uniformity.

The second circuit C2 shown in FIG. 3B is basically the same as the second circuit C2 shown in FIG. 3A.

Figure 4:
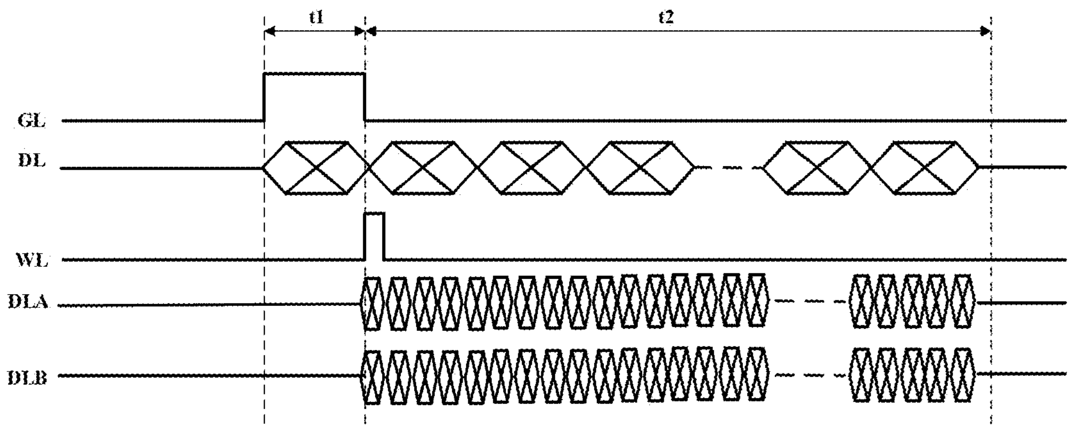
FIG. 4 is a timing diagram illustrating operation of a pixel driving circuit in some embodiments of the present disclosure.

FIG. 4 is a timing diagram illustrating operation of a pixel driving circuit in some embodiments of the present disclosure. Referring to FIGS. 3A, 3B and 4, during one frame of image, the operation of the pixel driving circuit includes a first phase t1 and a second phase t2. In the first phase t1, a turn-on voltage signal is provided to the gate electrode of the data writing-in transistor Tw through the gate line GL to turn on the data writing-in transistor Tw. The data signal provided by the data line DL are written into the first node N1 through the data writing-in transistor Tw, and the data signal is stored in the storage capacitor C.

In the second phase t2, the effective voltage of the digital selection signal is provided to the gate electrodes of the first transistor T1 and the second transistor T2 through the digital selection signal line WL, thereby turning on the first transistor T1 and the second transistor T2. The first digital data signal provided by the first digital data signal line DLA is transmitted to the first latch node NC1 through the first transistor T1, and the second digital signal provided by the second digital data signal line DLB is transmitted to the second latch node NC2 through the second transistor T2.

In some embodiments, when the first latch node NC1 is charged to a logic high voltage level (e.g., “1”) and the second latch node NC2 is charged to a logic low voltage level (e.g., “0”), the sixth transistor T6 is turned on by the logic high voltage level at the first latch node NC1, and the low voltage signal from the low voltage signal line Vgl is transmitted to the second latch node NC2 through the sixth transistor T6, so that the second latch node NC2 is maintained at a logic low voltage level. At the same time, the third transistor T3 is turned on by the logic low voltage level at the second latch node NC2, and the voltage supply signal from the voltage supply signal line Vdd is transmitted to the first latch node NC1 through the third transistor T3, so that the first latch node NC1 is maintained at a logic high voltage level. When the first latch node NC1 is charged to a logic high voltage level and the second latch node NC2 is charged to a logic low voltage level, the light emitting control transistor Te is turned on to allow the driving current to flow from the second electrode of the driving transistor to the light emitting element LE.

In some embodiments, when the first latch node NC1 is charged to a logic low voltage level (e.g., “0”) and the second latch node NC2 is charged to a logic high voltage level (e.g., “1”), the fifth transistor T5 is turned on by the logic high voltage level at the second latch node NC2, and the low voltage signal from the low voltage signal line Vgl is transmitted to the first latch node NC1 through the fifth transistor T5, so that the first latch node NC1 is maintained at a logic low voltage level. At the same time, the fourth transistor T4 is turned on by the logic low voltage level at the first latch node NC1, and the voltage supply signal from the voltage supply signal line Vdd is transmitted to the second latch node NC2 through the fourth transistor T4, so that the second latch node NC2 is maintained at a logic high voltage level. When the first latch node NC1 is charged to a logic low voltage level and the second latch node NC2 is charged to a logic high voltage level, the light emitting control transistor Te is turned off, thereby not allowing the driving current to flow from the second electrode of the driving transistor to the light emitting element LE.

Therefore, the frequency and duration of the effective voltage of the digital selection signal supplied to the digital selection signal line WL during one frame of image determine the frequency and duration of the driving current received by the light emitting element LE during one frame of image, thereby controlling the grayscale of the sub-pixel having the light emitting element LE. In one example, the frequency of the effective voltage of the digital selection signal provided to the digital selection signal line WL during one frame of image is higher, resulting in a higher grayscale of the sub-pixel having the light emitting element LE. In another example, the duration of each individual effective voltage of the digital selection signal provided to the digital selection signal line WL during one frame of image is longer, resulting in a higher gray scale of the sub-pixel having the light emitting element LE.

The inventors of the present disclosure have found that, surprisingly and unexpectedly, a more stable and reliable display can be achieved using the pixel driving circuit. In the driving circuit, the first circuit is configured to provide a driving current, and the second circuit is configured to control a duration during which the light emitting element receives the driving current during one frame of image. The second circuit has higher stability, especially in terms of control duration. The inventors of the present disclosure have found that the pixel driving circuit of the present disclosure is particularly beneficial for display panels with silicon-based backplanes. In one example, the pixel driving circuit of the present disclosure is fabricated on a silicon-based substrate. In another example, the pixel driving circuit of the present disclosure is suitable for implementation in a display panel with lower grayscale requirements. Due to the storage function of the second circuit, the display in this type of display panel is more stable and reliable, and easier to implement.

In some embodiments, the silicon-based backplane or silicon-based substrate includes silicon elements, such as polycrystalline silicon or monocrystalline silicon. Transistors fabricated on silicon-based backplanes or silicon-based substrates have smaller dimensions, for example, in the range of tens to hundreds of nanometers, compared to glass-based backplanes or glass-based substrates, whereas the dimensions of the transistors fabricated on the glass-based backplane or glass-based substrate range from a few microns to tens of microns. Silicon-based transistors have turn-on times in the range of tens of picoseconds, while glass-based transistors have turn-on times between tens and hundreds of nanoseconds.

Figure 5A:
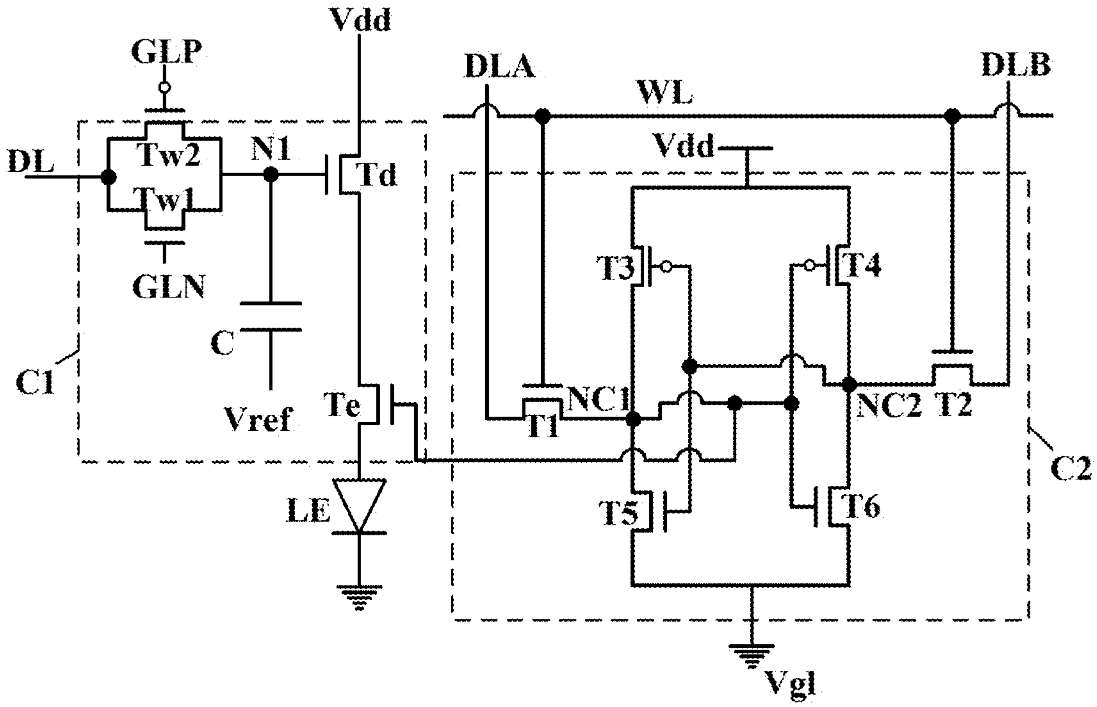
FIG. 5A is a schematic diagram illustrating the structure of a pixel driving circuit in some embodiments of the present disclosure.

FIG. 5A is a schematic diagram illustrating the structure of a pixel driving circuit in some embodiments of the present disclosure. Referring to FIG. 5A, the first sub-circuit includes a first data writing-in transistor Tw1 and a second data writing-in transistor Tw2. Alternatively, the first data writing-in transistor Tw1 is an n-type transistor, and the second data writing-in transistor Tw2 is a p-type transistor. The first electrode of the storage capacitor C is coupled to the first node N1. The second electrode of the storage capacitor C is coupled to the reference voltage signal line Vref and is configured to receive the reference voltage signal from the reference voltage signal line Vref.

The gate electrode of the first data writing-in transistor Tw1 is coupled to the first gate line GLN and is configured to receive the first gate driving signal from the first gate line GLN. The gate electrode of the second data writing-in transistor Tw2 is coupled to the second gate line GLP and is configured to receive the second gate driving signal from the second gate line GLP. The effective voltage level of the first gate driving signal is a high voltage level, and the effective voltage level of the second gate driving signal is a low voltage level. The first data writing-in transistor Tw1 and the second data writing-in transistor Tw2 have different on-voltages. Especially for micro-light emitting diodes, due to limitations in manufacturing processes and technologies, the data range that the pixel driving circuit applies to the light emitting elements is limited to a certain extent, resulting in a limited range of sub-pixel brightness adjustment. The first data writing-in transistor Tw1 and the second data writing-in transistor Tw2 have different on-voltages, so that the data range applied to the light emitting element by the pixel driving circuit can be increased.

Figure 5B:
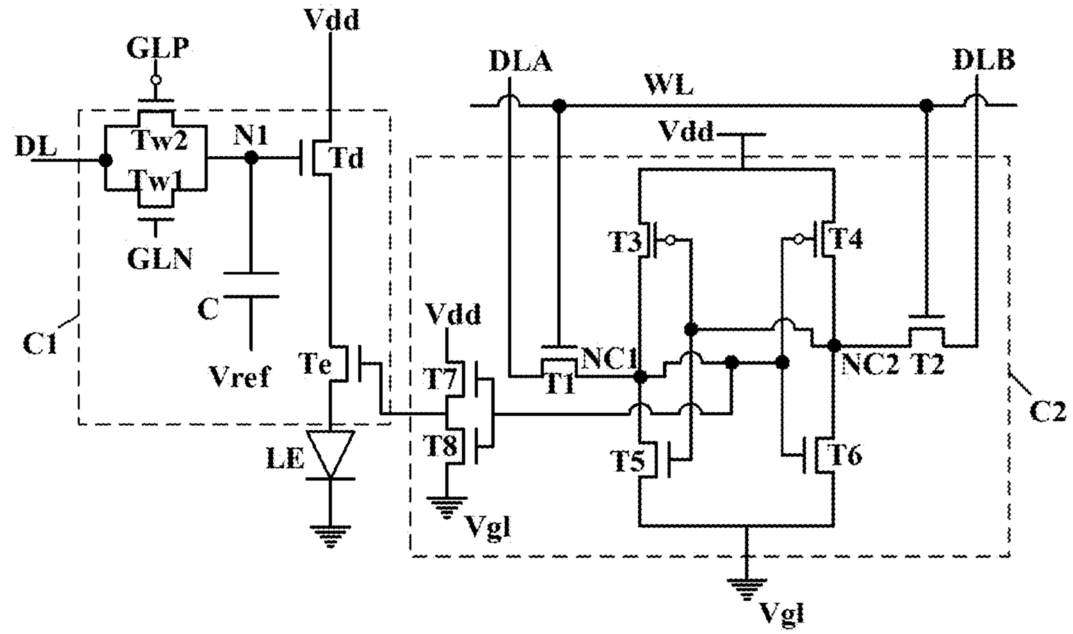
FIG. 5B is a schematic diagram illustrating the structure of a pixel driving circuit in some embodiments of the present disclosure.

FIG. 5B is a schematic diagram illustrating the structure of a pixel driving circuit in some embodiments of the present disclosure. The first circuit C1 shown in FIG. 5B is basically the same as the first circuit C1 shown in FIG. 5A. Referring to FIG. 5B, in some embodiments, the second circuit C2 further includes a seventh transistor T7 and an eighth transistor T8.

The gate electrodes of the seventh transistor T7 and the eighth transistor T8 are coupled to the first latch node NC1.

The second electrodes of the seventh transistor T7 and the eighth transistor T8 are coupled to the gate electrode of the light emitting control transistor Te.

The first electrode of the seventh transistor T7 is coupled to the voltage supply signal line Vdd.

The first electrode of the eighth transistor T8 is coupled to the low voltage signal line Vgl.

The gate electrode of the light emitting control transistor Te is coupled to the second electrodes of the seventh transistor T7 and the eighth transistor T8. The first electrode of the light emitting control transistor Te is coupled to the second electrode of the driving transistor Td. The second electrode of the light emitting control transistor Te is coupled to the anode of the light emitting element LE.

In some embodiments, the first latch node NC1 is coupled to the gate electrodes of the seventh and eighth transistors T7 and T8. The voltage level at the first latch node NC1 is configured to control to turn on or off the seventh transistor T7 and the eighth transistor T8. The voltage level at the first latch node NC1 is configured to control the seventh transistor T7 to allow or not allow the voltage supply signal from the voltage supply signal line Vdd to transmit to the gate electrode of the light emitting control transistor Te through the seventh transistor T7. In turn, the voltage level at the first latch node NC1 is configured to control the third sub-circuit SC3 to allow or not allow the driving current from the second sub-circuit SC2 to reach the light emitting element LE through the third sub-circuit SC3.

In some embodiments, the first transistor T1 is turned on by the gate-on voltage provided by the digital selection signal line WL, thereby allowing the first digital data signal from the first digital data signal line DLA to be transmitted to the first latch Node NC1. The second transistor T2 is turned on by the gate-on voltage provided by the digital selection signal line WL, thereby allowing the second digital data signal from the second digital data signal line DLB to be transmitted to the second latch node NC2. The first digital data signal and the second digital data signal are latched by the latch LA. When the voltage level at the first latch node NC1 is a valid voltage level (e.g., a high voltage level), the third sub-circuit SC3 (including the light emitting control transistor Te) allows the driving current from the second sub-circuit SC2 to reach the light emitting element LE through the third sub-circuit SC3. When the voltage level at the first latch node NC1 is an invalid voltage level (e.g., a low voltage level), the third sub-circuit SC3 (including the light emitting control transistor Te) does not allow driving current from the second sub-circuit SC2 to reach the light emitting element LE through the third sub-circuit SC3.

The inventor of the present disclosure found that by providing the seventh transistor T7 and the eighth transistor T8, the voltage signal at the first latch node NC1 can be rectified by the seventh transistor T7 and the eighth transistor T8, and a more stable control signal can be output to the gate electrode of the light emitting control transistor Te.

Figure 6:
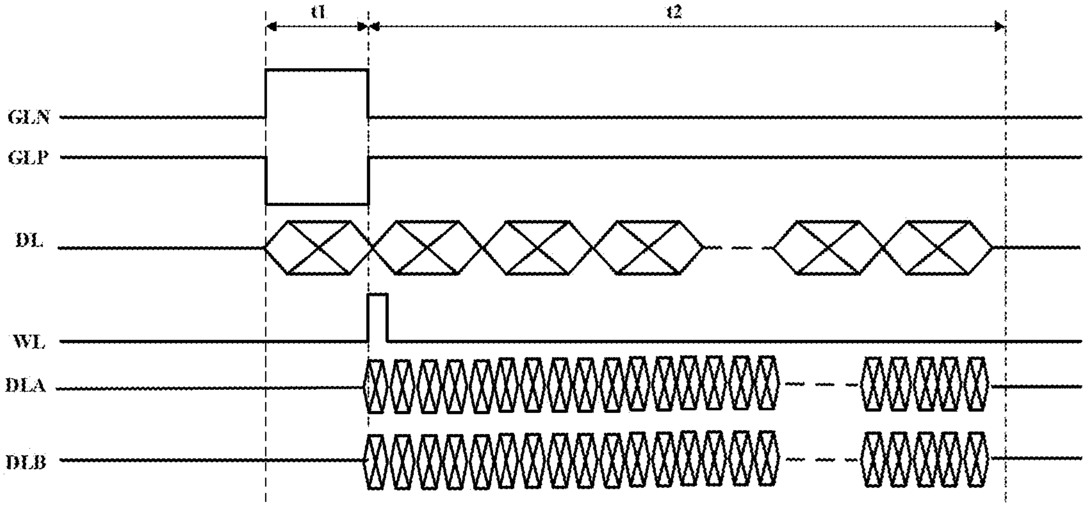
FIG. 6 is a timing diagram illustrating operation of a pixel driving circuit in some embodiments of the present disclosure.

FIG. 6 is a timing diagram illustrating operation of a pixel driving circuit in some embodiments of the present disclosure. Referring to FIGS. 5A, 5B and 6, during one frame of image, the operation of the pixel driving circuit includes a first phase t1 and a second phase t2. In the first phase t1, a turn-on voltage signal (high voltage signal) is provided to the gate electrode of the first data writing-in transistor Tw1 through the first gate line GLN, thereby turning on the first data writing-in transistor Tw1. The turn-on voltage signal (low voltage signal) is supplied to the gate electrode of the second data writing-in transistor Tw2 through the second gate line GLP, thereby turning on the second data writing-in transistor Tw2. The data signal provided by the data line DL is written into the first node N1 through the first data writing-in transistor Tw1 and the second data writing-in transistor Tw2 respectively, and the data signal is stored in the storage capacitor C.

In the second phase t2, the effective voltage of the digital selection signal is provided to the gate electrodes of the first transistor T1 and the second transistor T2 through the digital selection signal line WL, thereby turning on the first transistor T1 and the second transistor T2. The first digital data signal provided by the first digital data signal line DLA is transmitted to the first latch node NC1 through the first transistor T1, and the second digital signal provided by the second digital data signal line DLB is transmitted to the second latch node NC2 through the second transistor T2.

In some embodiments, when the first latch node NC1 is charged to a logic high voltage level (e.g., "1") and the second latch node NC2 is charged to a logic low voltage level (e.g., "0"), the sixth transistor T6 is turned on by the logic high voltage level at the first latch node NC1, and the low voltage signal from the low voltage signal line Vgl is transmitted to the second latch node NC2 through the sixth transistor T6, so that the second latch node NC2 is maintained at a logic low voltage level. At the same time, the third transistor T3 is turned on by the logic low voltage level at the second latch node NC2, and the voltage supply signal from the voltage supply signal line Vdd is transmitted to the first latch node NC1 through the third transistor T3, so that the first latch node NC1 is maintained at a logic high voltage level. When the first latch node NC1 is charged to a logic high voltage level and the second latch node NC2 is charged to a logic low voltage level, the light emitting control transistor Te is turned on to allow the driving current to flow from the second electrode of the driving transistor to the light emitting element LE.

In some embodiments, when the first latch node NC1 is charged to a logic low voltage level (e.g., "0") and the second latch node NC2 is charged to a logic high voltage level (e.g., "1"), the fifth transistor T5 is turned on by the logic high voltage level at the second latch node NC2, and the low voltage signal from the low voltage signal line Vgl is transmitted to the first latch node NC1 through the fifth transistor T5, so that the first latch node NC1 is maintained at a logic low voltage level. At the same time, the fourth transistor T4 is turned on by the logic low voltage level at the first latch node NC1, and the voltage supply signal from the voltage supply signal line Vdd is transmitted to the second latch node NC2 through the fourth transistor T4, so that the second latch node NC2 is maintained at a logic high voltage level. When the first latch node NC1 is charged to a logic low voltage level and the second latch node NC2 is charged to a logic high voltage level, the light emitting control transistor Te is turned off, thereby not allowing the driving current to flow from the second electrode of the driving transistor to the light emitting element LE.

Therefore, the frequency and duration of the effective voltage of the digital selection signal supplied to the digital selection signal line WL during one frame of image determine the frequency and duration of the driving current received by the light emitting element LE during one frame of image, thereby controlling the grayscale of the sub-pixel having the light emitting element LE. In one example, the frequency of the effective voltage of the digital selection signal provided to the digital selection signal line WL during one frame of image is higher, resulting in a higher grayscale of the sub-pixel having the light emitting element LE. In another example, the duration of each individual effective voltage of the digital selection signal provided to the digital selection signal line WL during one frame of image is longer, resulting in a higher gray scale of the sub-pixel having the light emitting element LE.

Figure 7:
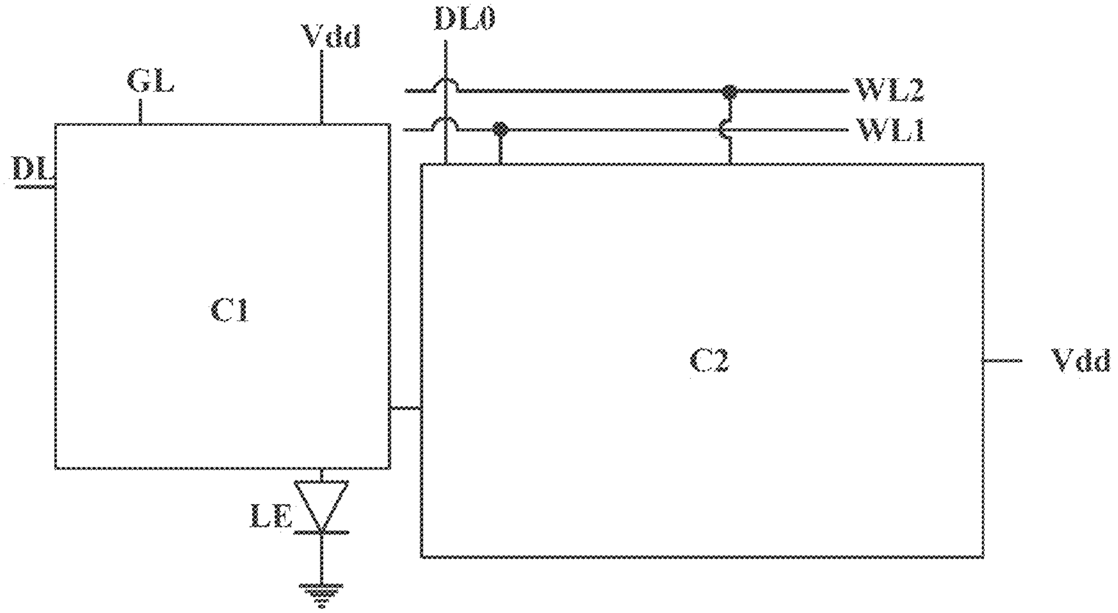
FIG. 7 is a schematic diagram illustrating the structure of a pixel driving circuit in some embodiments of the present disclosure.

FIG. 7 is a schematic diagram showing the structure of a pixel driving circuit in some embodiments according to the present disclosure. Referring to FIG. 7, in some embodiments, the pixel driving circuit includes a first circuit C1 and a second circuit C2. The first circuit C1 is configured to provide a driving current to the light emitting element LE, and the second circuit C2 is configured to control the frequency and duration of the driving current received by the light emitting element LE during one frame of image, thereby controlling the gray scale of the sub-pixel having the light emitting element LE.

Referring to FIG. 7, in some embodiments, the first circuit C1 is configured to receive a gate driving signal from the gate line GL, a data signal from the data line DL, and a voltage supply signal from the voltage supply signal line Vdd.

Referring to FIG. 7, in some embodiments, the second circuit C2 is configured to receive a digital selection signal from two digital selection signal lines (a first digital selection signal line WL1 and a second digital selection signal line WL2 respectively), receive the digital data signal from one digital data signal line DL0. Optionally, the second circuit C2 is further configured to receive the voltage supply signal from the voltage supply signal line Vdd.

In some embodiments, the first circuit C1 is coupled to the second circuit C2 and to the anode of the light emitting element LE. Optionally, the first circuit C1 is configured to provide a driving current to the light emitting element LE under the control of the second circuit C2. Alternatively, the frequency and duration at which the light emitting element LE receives the driving current during one frame of image are related to the frequency and duration of the effective voltage of the digital selection signal provided to the digital selection signal line WL during one frame of image.

Figure 8:
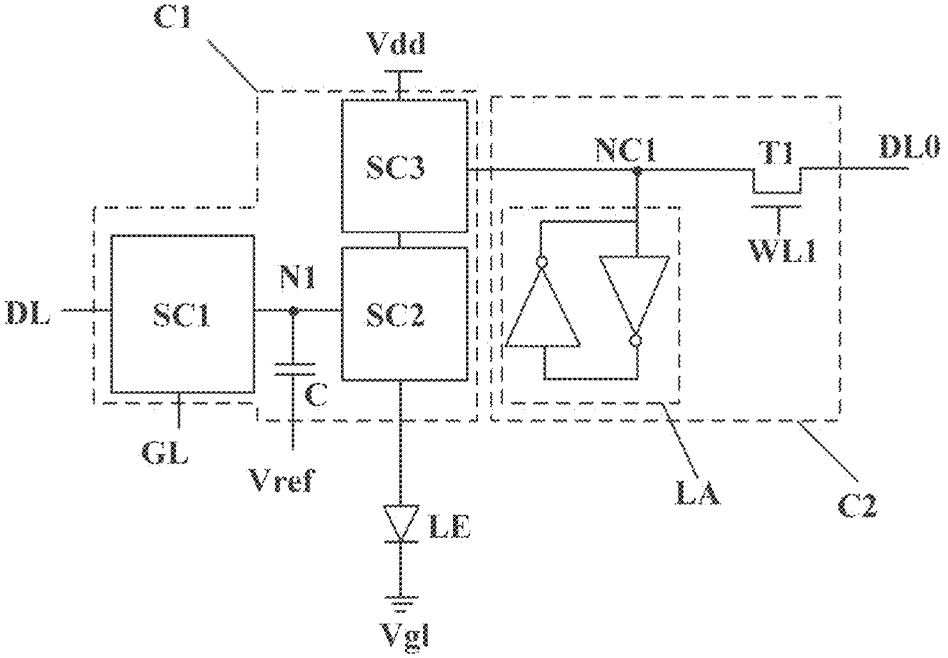
FIG. 8 is a schematic diagram showing the structure of a pixel driving circuit in some embodiments of the present disclosure.

FIG. 8 is a schematic diagram showing the structure of a pixel driving circuit in some embodiments of the present disclosure. Referring to FIG. 8, in some embodiments, the first circuit C1 includes a first sub-circuit SC1 coupled to the data line DL and the gate line. The first sub-circuit SC1 is configured to write a data signal into the first node N1.

In some embodiments, the first circuit C1 further includes a second sub-circuit SC2 coupled to the first node N1 and coupled to the light emitting element LE.

In some embodiments, the first circuit C1 further includes a third sub-circuit SC3 coupled to the second sub-circuit SC2, coupled to the voltage supply signal line Vdd, and coupled to the second circuit C2.

In some embodiments, the second circuit C2 includes a latch LA and a first transistor T1. The at least one digital selection signal line WL includes a first digital selection signal line WL1. The gate electrode of the first transistor T1 is coupled to the first digital selection signal line WL1 and is configured to receive the digital selection signal from the first digital selection signal line WL1. The first electrode of the first transistor T1 is coupled to the digital data signal line DL0 and is configured to receive the digital data signal from the digital data signal line DL0. The second electrode of the first transistor T1 is coupled to the latch LA.

In some embodiments, first latch node NC1 is coupled to third sub-circuit SC3. The voltage level at the first latch node NC1 is configured to control the third sub-circuit SC3 to allow or not allow the second sub-circuit SC2 to be connected to the voltage supply signal line Vdd, thereby allowing or not allowing signals the second sub-circuit SC2 to provide a driving current to the light emitting element LE.

In some embodiments, the first transistor T1 is turned on by the gate-on voltage provided by the first digital selection signal line WL1, thereby allowing the digital data signal from the digital data signal line DL0 to be transmitted to the first latch node NC1. The digital data signal is latched by latch LA. When the voltage level at the first latch node NC1 is a valid voltage level (e.g., a low voltage level), the third sub-circuit SC3 connects the voltage supply signal line Vdd to the second sub-circuit SC2, thereby allowing the second sub-circuit SC2 to provide a driving current for the light emitting element LE. When the voltage level at the first latch node NC1 is an invalid voltage level (e.g., a high voltage level), the third sub-circuit SC3 disconnects the voltage supply signal line Vdd from the second sub-circuit SC2 so as not to not allow the second sub-circuit SC2 to provide a driving current for the light emitting element LE.

The inventor of the present disclosure found that compared with the pixel driving circuit in FIG. 3A, FIG. 5A and FIG. 5B, in the pixel driving circuit shown in FIG. 8, the light emitting control transistor Te is coupled between the driving transistor Td and the voltage supply signal line Vdd. In this case, when the light emitting control transistor Te is turned on, the voltage difference between the gate electrode and the source electrode is very large, which can reduce the cross-voltage of the light emitting control transistor Te, thereby increasing the maximum value of the driving current, that is, improving the maximum brightness of light emitting element LE.

Figure 9:
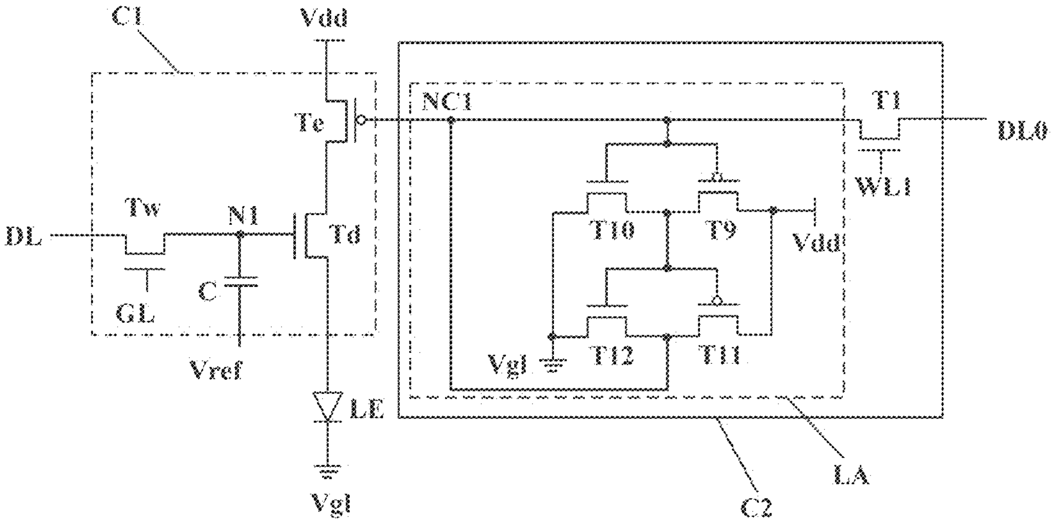
FIG. 9 is a schematic diagram illustrating the structure of a pixel driving circuit in some embodiments of the present disclosure.

FIG. 9 is a schematic diagram showing the structure of a pixel driving circuit in some embodiments according to the present disclosure. Referring to FIG. 9, the first sub-circuit SC1 includes at least one data writing-in transistor Tw. As shown in FIG. 9, the first sub-circuit SC1 only includes one data writing-in transistor Tw; the second sub-circuit SC2 includes the driving transistor Td, and the third sub-circuit SC3 includes the light emitting control transistor Te.

The gate electrode of the data writing-in transistor Tw is coupled to the gate line GL, the first electrode of the data writing-in transistor Tw is coupled to the data line DL, and the second electrode of the data writing-in transistor Tw is coupled to the first node N1.

The first electrode of the storage capacitor C is coupled to the first node N1. the second electrode of the storage capacitor C is coupled to the reference voltage signal line Vref and is configured to receive the reference voltage signal from the reference voltage signal line Vref.

The gate electrode of the light emitting control transistor Te is coupled to the first latch node NC1, the first electrode of the light emitting control transistor Te is coupled to the voltage supply signal line Vdd, and the second electrode of the light emitting control transistor Te is coupled to the first electrode of the driving transistor Td. The gate electrode of the driving transistor Td is coupled to the first node N1, and the second electrode of the driving transistor Td is coupled to the anode of the light emitting element LE.

Referring to FIG. 9, in some embodiments, the latch LA includes a ninth transistor T9, a tenth transistor T10, an eleventh transistor T11, and a twelfth transistor T12. In the example shown in FIG. 9, the ninth transistor T9 and the eleventh transistor T11 are p-type transistors; the first transistor T1, the tenth transistor T10 and the twelfth transistor T12 are n-type transistors.

The gate electrode of the ninth transistor T9 and the gate electrode of the tenth transistor T10 are coupled to the first latch node NC1, which is coupled to the second electrode of the first transistor T1.

The first electrode of the ninth transistor T9 is coupled to the voltage supply signal line Vdd and is configured to receive the voltage supply signal from the voltage supply signal line Vdd; the second electrode of the ninth transistor T9 is coupled to the second electrode of the tenth transistor T10, the gate electrode of the eleventh transistor T11 and the gate electrode of the twelfth transistor T12.

The first electrode of the eleventh transistor T11 is coupled to the voltage supply signal line Vdd, and the second electrode of the eleventh transistor T12 is coupled to the second electrode of the twelfth transistor T12. The first electrode of the tenth transistor T10 and the first electrode of the twelfth transistor T12 are coupled to the low-voltage signal line and are configured to receive the low voltage signal from the low voltage signal line Vgl.

Figure 10:
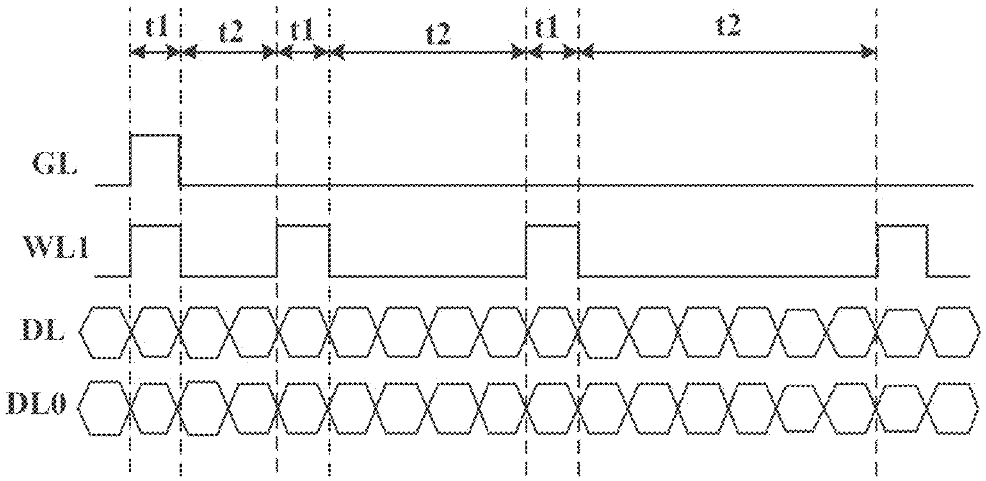
FIG. 10 is a timing diagram illustrating the operation of a pixel driving circuit in some embodiments of the present disclosure.

FIG. 10 is a timing diagram illustrating the operation of a pixel driving circuit in some embodiments of the present disclosure. Referring to FIGS. 9 and 10, during one frame of image, the operation of the pixel driving circuit includes a first phase t1 and a second phase t2.

In the first phase t1, a turn-on voltage signal (e.g., a high voltage signal) is provided to the gate electrode of the data writing-in transistor Tw through the gate line GL, thereby turning on the data writing-in transistor Tw. The data signal provided by the data line DL is written into the first node N1 through the data writing-in transistor Tw, and the data signal is stored in the storage capacitor C.

The effective voltage of the first digital selection signal is provided to the gate electrode of the first transistor T1 through the first digital selection signal line WL1, thereby turning on the first transistor T1. The digital data signal provided by the digital data signal line DL0 is transmitted to the first latch node NC1 through the first transistor T1, and the digital data signal is latched using the latch LA.

In the second phase t2, a cut-off voltage signal (e.g., a low voltage signal) is provided to the gate electrode of the data writing-in transistor Tw through the gate line GL, thereby turning off the data writing-in transistor Tw. The gate potential of the driving transistor Td is maintained by the storage capacitor C.

When the first latch node NC1 is charged to a logic low voltage level (e.g., “0”), the ninth transistor T9 is turned on by the logic low voltage level at the first latch node NC1, the voltage supply signal from the voltage supply signal line Vdd is transmitted to the second latch node NC2 through the ninth transistor T9; at the same time, the twelfth transistor T12 is turned on by the logic high voltage level at the second latch node NC2, the low voltage signal from the low voltage signal line Vgl is transmitted to the first latch node NC1 through the twelfth transistor T12, thereby maintaining the first latch node NC1 at a logic low voltage level.

When the first latch node NC1 is charged to a logic low voltage level, the light emitting control transistor Te is turned on to allow the voltage supply signal line Vdd to be connected to the driving transistor Td, which provides a driving current for the light emitting element LE.

When the first latch node NC1 is charged to a logic high voltage level (e.g., “1”), the tenth transistor T10 is turned on by the logic high voltage level at the first latch node NC1, the low voltage signal from the low voltage signal line Vgl is transmitted to the second latch node NC2 through the tenth transistor T10. At the same time, the eleventh transistor T11 is turned on by the logic low voltage level at the second latch node NC2, and the voltage supply signal from the voltage supply signal line Vdd is transmitted to the first latch node NC1 through the eleventh transistor T11, thereby maintaining the first latch node NC1 at a logic high voltage level.

When the first latch node NC1 is charged to a logic high voltage level, the light emitting control transistor Te is turned off, thereby disconnecting the voltage supply signal line Vdd from the driving transistor Td. The driving transistor Td cannot provide driving current for the light emitting element LE.

Therefore, the frequency and duration of the effective voltage of the first digital selection signal provided to the first digital selection signal line WL1 during one frame of image determine the frequency and duration of the driving current received by the light emitting element LE during one frame of image, so that the gray scale of the sub-pixel having the light emitting element LE is controlled. In one example, the frequency of the effective voltage of the first digital selection signal provided to the first digital selection signal line WL1 during one frame of image is higher, resulting in a higher grayscale of the sub-pixel having the light emitting element LE. In another example, the duration of each individual effective voltage of the first digital selection signal provided to the first digital selection signal line WL1 during one frame of image is longer, resulting in a higher grayscale of the sub-pixel having the light emitting element LE.

For example, during one frame of image, the number of times the digital data signal reaches the effective voltage level is n times, that is, one frame of image contains n light emitting phases, and the duration of each light emitting phase is 0 or time_1-time_n. Therefore, by controlling the time the digital data signal is at a valid voltage level each time, $2^n$ kinds of light emitting durations can be obtained. For example, n=3, 8 kinds of light emitting durations are shown in Table 1 below, that is, 8 kinds of gray scales.

TABLE 1

| DL(1) | DL(2) | DL(3) | Duration of light emitting |
|---|---|---|---|
| 1 | 1 | 1 | 0 |
| 0 | 1 | 1 | time_1 |
| 1 | 0 | 1 | time_2 |
| 0 | 0 | 1 | time_1 + time_2 |
| 1 | 1 | 0 | time_3 |
| 0 | 1 | 0 | time_1 + time_3 |
| 1 | 0 | 0 | time_2 + time_3 |
| 1 | 1 | 1 | time_1 + time_2 + time_3 |

It should be noted that the light emitting control transistor Te in FIG. 9 can be a p-type transistor. At this time, when the first latch node NC1 is charged to a low voltage level, the light emitting control transistor Te is turned on; when the first latch node NC1 is charged to a high voltage level, the light emitting control transistor Te is turned off. Of course, the light emitting control transistor Te can also be an n-type transistor. At this time, when the first latch node NC1 is charged to a high voltage level, the light emitting control transistor Te is turned on; when the first latch node NC1 is charged to a low voltage level, the light emitting control transistor Te is turned off.

Figure 11:
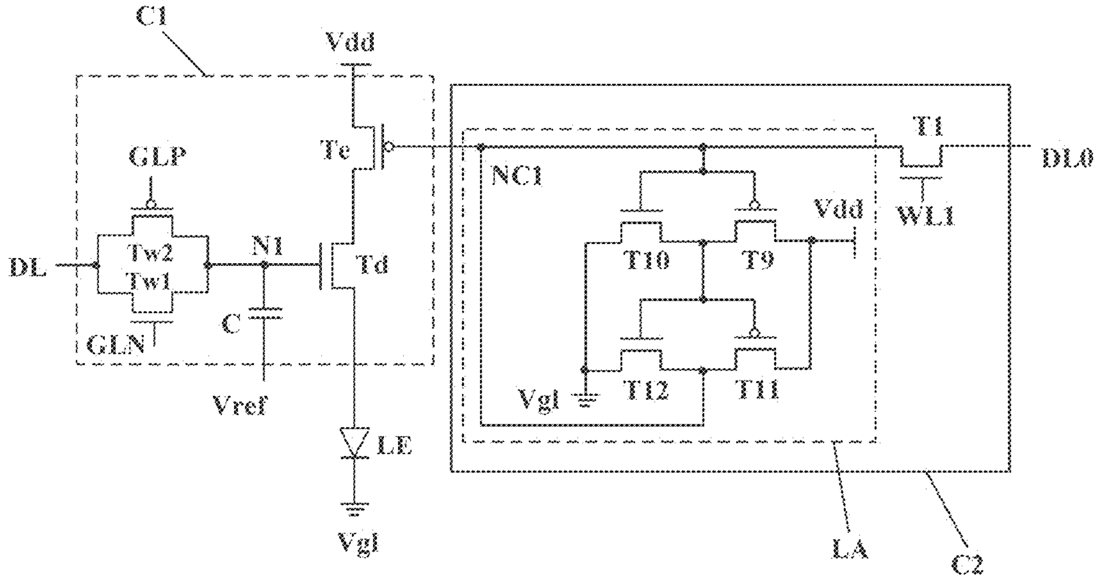
FIG. 11 is a schematic diagram showing the structure of a pixel driving circuit in some embodiments of the present disclosure.

FIG. 11 is a schematic diagram showing the structure of a pixel driving circuit in some embodiments according to the present disclosure. Referring to FIG. 11, the first circuit C1 is a 4T1C circuit. In some embodiments, referring to FIG. 11, the first sub-circuit SC1 includes two data writing-in transistors, denoted as a first data writing-in transistor Tw1 and a second data writing-in transistor Tw2 respectively. Alternatively, the first data writing-in transistor Tw is an n-type transistor, and the second data writing-in transistor Tw2 is a p-type transistor. The first electrode of the storage capacitor C is coupled to the first node N1. The second electrode of the storage capacitor C is coupled to the reference voltage signal line Vref and is configured to receive the reference voltage signal from the reference voltage signal line Vref.

The gate electrode of the first data writing-in transistor Tw1 is coupled to the first gate line GLN and is configured to receive the first gate driving signal from the first gate line GLN. The gate electrode of the second data writing-in transistor Tw2 is coupled to the second gate line GLP and is configured to receive the second gate driving signal from the second gate line GLP. The effective voltage level of the first gate driving signal is a high voltage level, and the effective voltage level of the second gate driving signal is a low voltage level. The first data writing-in transistor Tw1 and the second data writing-in transistor Tw2 have different on-voltages. Especially for micro-light emitting diodes, due to limitations in manufacturing processes and technologies, the data range that the pixel driving circuit applies to the light emitting elements is limited to a certain extent, resulting in a limited range of sub-pixel brightness adjustment. By having the first data writing-in transistor Tw1 and the second data writing-in transistor Tw2 have different on-voltages, the data range applied to the light emitting element by the pixel driving circuit can be increased.

The second sub-circuit SC2, the third sub-circuit SC3 and the second circuit C2 in FIG. 11 have the same structure as the second sub-circuit SC2, the third sub-circuit SC3 and the second circuit C2 in FIG. 9 respectively, and will not be described again here.

Figure 12:
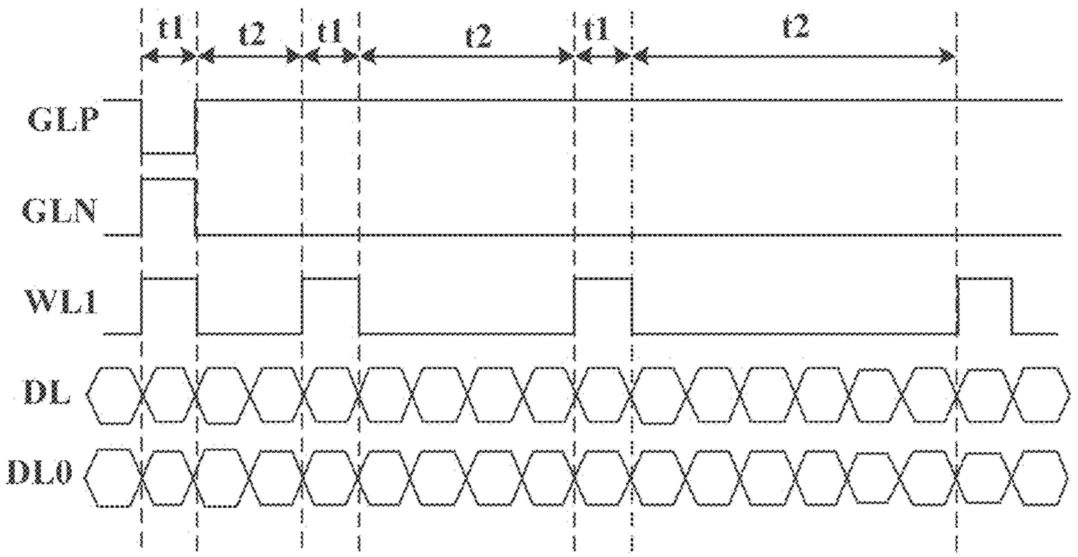
FIG. 12 is a timing diagram illustrating the operation of a pixel driving circuit in some embodiments of the present disclosure.

FIG. 12 is a timing diagram illustrating the operation of the pixel driving circuit in some embodiments according to the present disclosure. Referring to FIGS. 11 and 12, during one frame of image, the operation of the pixel driving circuit includes a first phase t1 and a second phase. t2. In the first phase t1, a turn-on voltage signal (high voltage signal) is provided to the gate electrode of the first data writing-in transistor Tw1 through the first gate line GLN, thereby turning on the first data writing-in transistor Tw1. The turn-on voltage signal (low voltage signal) is supplied to the gate electrode of the second data writing-in transistor Tw2 through the second gate line GLP, thereby turning on the second data writing-in transistor Tw2. The data signal provided by the data line DL is written into the first node N1 through the first data writing-in transistor Tw1 and the second data writing-in transistor Tw2 respectively, and the data signal is stored in the storage capacitor C.

The effective voltage of the first digital selection signal is provided to the gate electrode of the first transistor T1 through the first digital selection signal line WL1, thereby turning on the first transistor T1. The digital data signal provided by the digital data signal line DL0 is transmitted to the first latch node NC1 through the first transistor T1, and the digital data signal is latched using the latch LA.

In the second phase t2, the same as the above description of FIG. 10, when the first latch node NC1 is charged to a logic low voltage level, the light emitting control transistor Te is turned on to allow the voltage supply signal line Vdd to be connected to the driving transistor Td, and the driving transistor Td provides driving current to the light emitting element LE. When the first latch node NC1 is charged to a logic high voltage level, the light emitting control transistor Te is turned off, thereby disconnecting the voltage supply signal line Vdd from the driving transistor Td. The driving transistor Td cannot provide driving current for the light emitting element LE.

Therefore, the frequency and duration of the effective voltage of the first digital selection signal provided to the first digital selection signal line WL1 during one frame of image determine the frequency and duration of the driving current received by the light emitting element LE during one frame of image, so that the gray scale of the sub-pixel having the light emitting element LE is controlled. In one example, the frequency of the effective voltage of the first digital selection signal provided to the first digital selection signal line WL1 during one frame of image is higher, resulting in a higher grayscale of the sub-pixel having the light emitting element LE. In another example, the duration of each individual effective voltage of the first digital selection signal provided to the first digital selection signal line WL1 during one frame of image is longer, resulting in a higher grayscale of the sub-pixel having the light emitting element LE.

Figure 13:
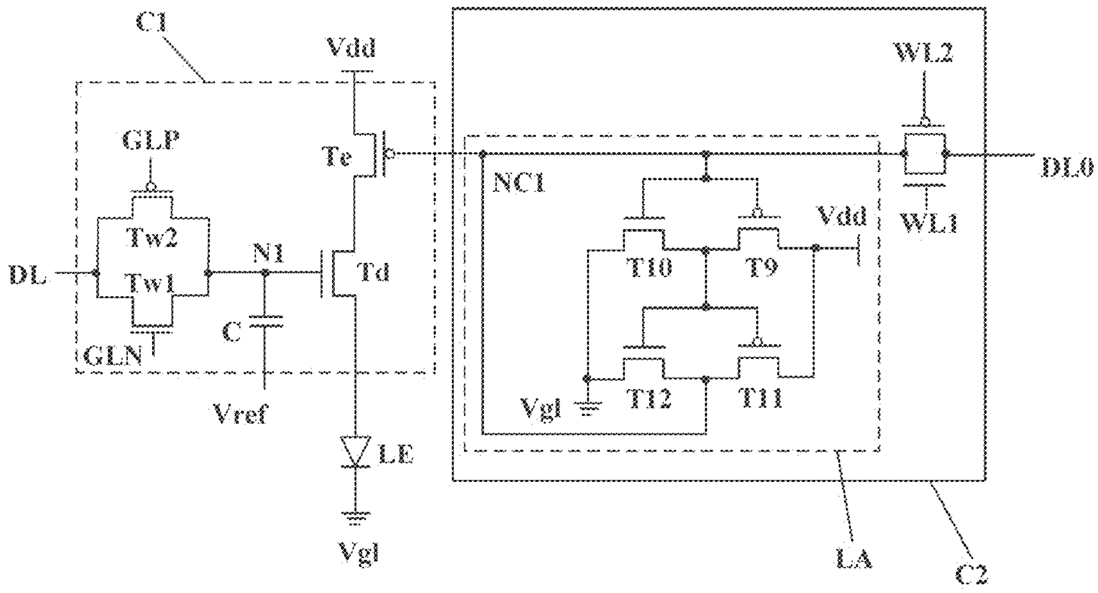
FIG. 13 is a schematic diagram showing the structure of a pixel driving circuit in some embodiments of the present disclosure.

FIG. 13 is a schematic diagram showing the structure of a pixel driving circuit in some embodiments of the present disclosure. Referring to FIG. 13, the structure of the first circuit C1 is the same as that of the first circuit C1 in FIG. 11. The second circuit C2 includes a first transistor T1, a second transistor T2, and a latch LA.

Referring to FIG. 13, in some embodiments, the second circuit C2 is connected to two digital selection signal lines and one digital data signal line DL0. The two digital selection signal lines are respectively the first digital selection signal line WL1 and the second digital selection signal line WL2. Wherein, the gate electrode of the first transistor T1 is coupled to the first digital selection signal line WL1 and is configured to receive the first digital selection signal from the first digital selection signal line WL1. The first electrode of the first transistor T1 is coupled to the digital data signal line DL0 and is configured to receive the digital data signal from the digital data signal line DL0. The second electrode of the first transistor T1 is coupled to the latch LA.

The gate electrode of the second transistor T2 is coupled to the second digital selection signal line WL2 and is configured to receive the second digital selection signal from the second digital selection signal line WL2. The first electrode of the second transistor T2 is coupled to the digital data signal line DL0 and is configured to receive the digital data signal from the digital data signal line DL0. The second electrode of the second transistor T2 is coupled to the latch LA.

Figure 14:
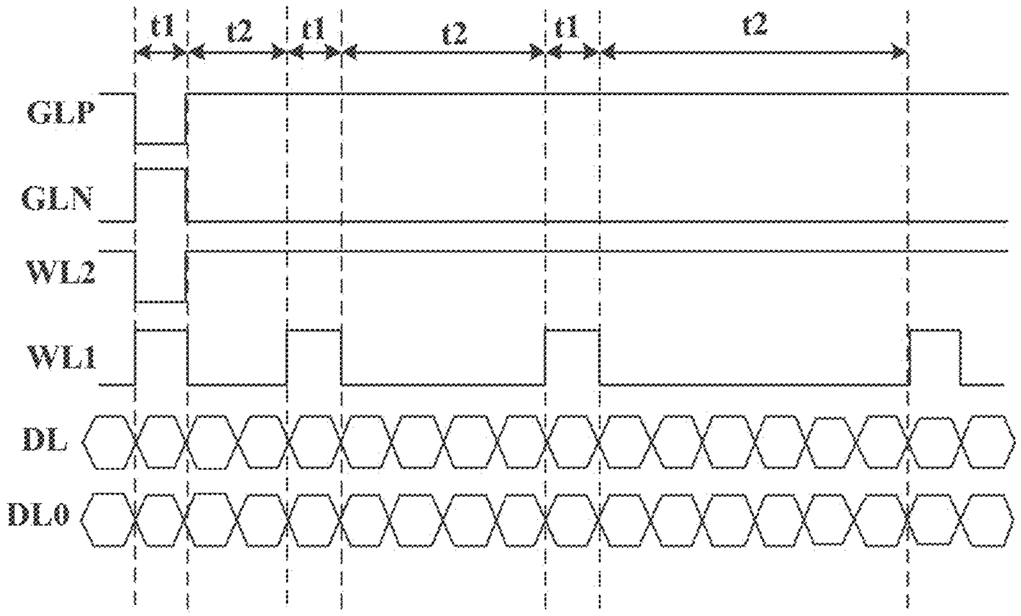
FIG. 14 is a timing diagram illustrating the operation of a pixel driving circuit in some embodiments of the present disclosure.

FIG. 14 is a timing diagram illustrating the operation of the pixel driving circuit in some embodiments according to the present disclosure. Referring to FIGS. 13 and 14, during one frame of image, the operation of the pixel driving circuit includes a first phase t1 and a second phase. t2. In the first phase t1, a turn-on voltage signal (high voltage signal) is provided to the gate electrode of the first data writing-in transistor Tw1 through the first gate line GLN, thereby turning on the first data writing-in transistor Tw1. The turn-on voltage signal (low voltage signal) is supplied to the gate electrode of the second data writing-in transistor Tw2 through the second gate line GLP, thereby turning on the second data writing-in transistor Tw2. The data signal provided by the data line DL passes through the first data writing-in transistor Tw1 and the second data writing-in transistor Tw2 respectively to write the data signal into the first node N1, and the data signal is stored in the storage capacitor C.

The effective voltage of the first digital selection signal is provided to the gate electrode of the first transistor T1 through the first digital selection signal line WL1, thereby turning on the first transistor T1. The effective voltage of the second digital selection signal is provided to the gate electrode of the second transistor T2 through the second digital selection signal line WL2, thereby turning on the second transistor T2. The digital data signal provided by the digital data signal line DL0 is transmitted to the first latch node NC1 through the first transistor T1 and the second transistor T2.

In the second phase t2, the same as the above description of FIG. 10, when the first latch node NC1 is charged to a logic low voltage level, the light emitting control transistor Te is turned on to allow the voltage supply signal line Vdd to communicate with the driving transistor. Td is turned on, and the driving transistor Td provides driving current to the light emitting element LE. When the first latch node NC1 is charged to a logic high voltage level, the light emitting control transistor Te is turned off, thereby disconnecting the voltage supply signal line Vdd from the driving transistor Td. The driving transistor Td cannot provide driving current for the light emitting element LE.

Therefore, the frequency and duration of the effective voltage of the first digital selection signal provided to the first digital selection signal line WL1 during one frame of image determine the frequency and duration of the driving current received by the light emitting element LE during one frame of image, so that the gray scale of the sub-pixel having the light emitting element LE is controlled. In one example, the frequency of the effective voltage of the first digital selection signal provided to the first digital selection signal line WL1 during one frame of image is higher, resulting in a higher grayscale of the sub-pixel having the light emitting element LE. In another example, the duration of each individual effective voltage of the first digital selection signal provided to the first digital selection signal line WL1 during one frame of image is longer, resulting in a higher grayscale of the sub-pixel having the light emitting element LE.

The inventor of the present disclosure found that compared with the structures in FIGS. 3A, 5A and 5B, the second circuit C2 in FIGS. 8, 9, 11 and 13 is coupled to one digital data signal line DL0, using a single digital signal as the control signal, which can reduce the space occupied by the internal signal lines of the pixel driving circuit and also reduce the complexity and power consumption of the external driving circuit.

Figure 15:
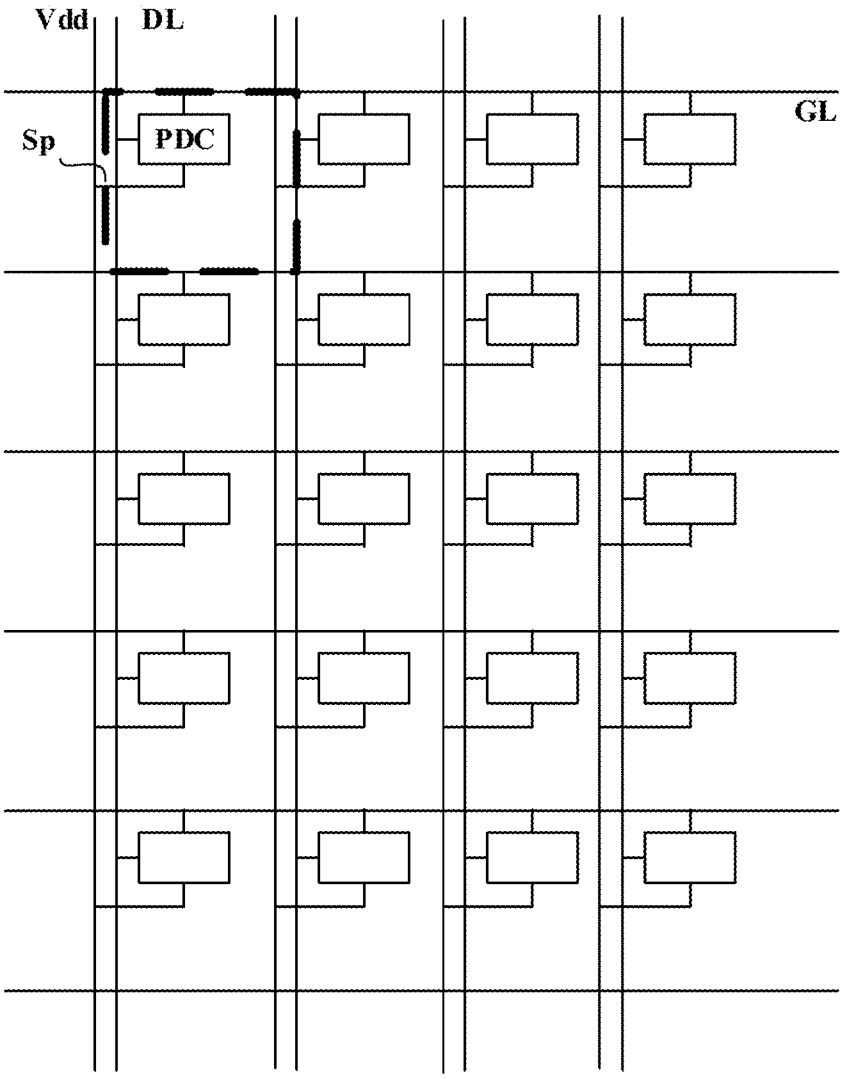
FIG. 15 is a plan view of a display device in some embodiments of the present disclosure.

In another aspect, the present disclosure provides a display device having the pixel driving circuit and a light emitting element connected to the pixel driving circuit. FIG. 15 is a plan view of a display device in some embodiments of the present disclosure. Referring to FIG. 15, in some embodiments, a display device includes an array of sub-pixels Sp. Each sub-pixel includes electronic components, such as light emitting elements. In one example, the light emitting element is driven by a pixel driving circuit PDC. The array substrate includes a plurality of gate lines, a plurality of data lines and a plurality of voltage supply lines. The light emitting of each sub-pixel is driven by the pixel driving circuit PDC. In one example, a high voltage signal is input to the pixel driving circuit PDC connected to the anode of the light emitting element through the voltage supply line Vdd; the low voltage signal is input to the cathode of the light emitting element. The voltage difference between a high voltage signal (e.g. VDD signal) and a low voltage signal (e.g. VSS signal) is the driving voltage $\Delta V$, which drives the light emitting element to emit light. In one example, the array substrate is fabricated on a silicon-based substrate.

Various appropriate light emitting elements can be used in the present array substrate. Examples of suitable light emitting elements include organic light emitting diodes, quantum dot light emitting diodes and micro light emitting diodes. Optionally, the light emitting element is a micro light emitting diode. In another example, the display device is an augmented reality display device. In another example, the display device is a wearable display device.

Examples of suitable display devices include, but are not limited to, electronic paper, mobile phones, tablet computers, televisions, monitors, notebook computers, digital photo albums, GPS, and the like. Optionally, the display device is an organic light emitting diode display device. Optionally, the display device is a micro light emitting diode display device. Optionally, the display device is a mini light emitting diode display device.

Figure 16:
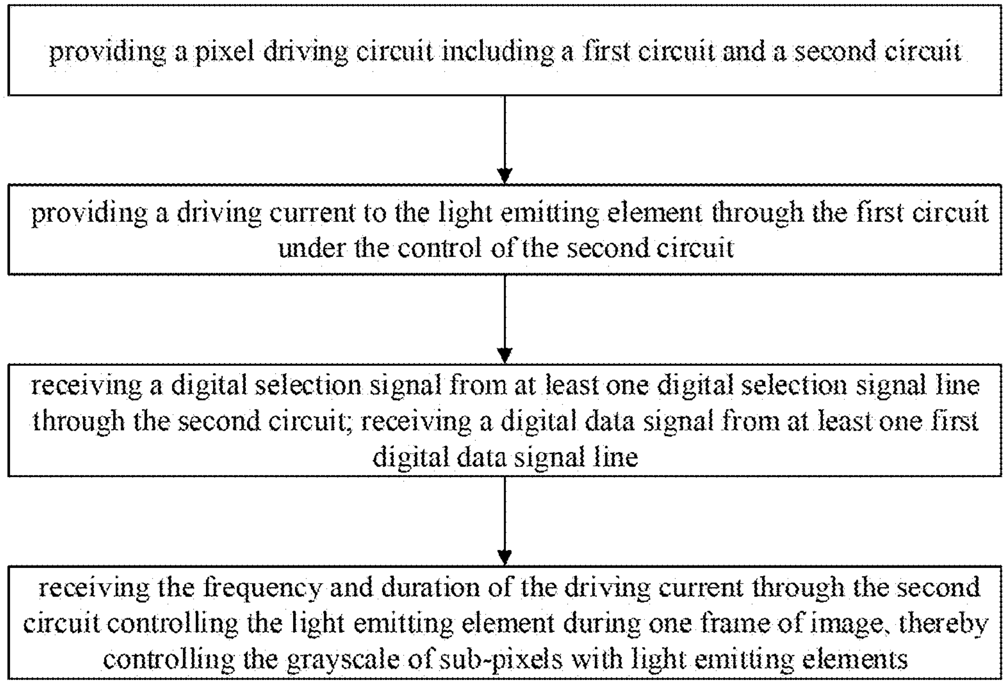
FIG. 16 is a flowchart illustrating a display method in some embodiments of the present disclosure.

In another aspect, the present disclosure provides a display method. FIG. 16 is a flowchart illustrating a display method in some embodiments of the present disclosure. Referring to FIG. 16, in some embodiments, the display method includes providing a pixel driving circuit, which includes a first circuit and a second circuit; under the control of the second circuit, providing a driving current to the light emitting element through the first circuit; receiving a digital selection signal from at least one digital selection signal line through the second circuit; receiving a digital data signal from at least one first digital data signal line; and receiving the frequency and duration of the driving current through the second circuit controlling the light emitting element during one frame of image, thereby controlling the grayscale of sub-pixels with light emitting elements.

In some embodiments, the second circuit, as shown in FIG. 2, includes a latch, a first transistor, and a second transistor. Optionally, gate electrodes of the first transistor and the second transistor are coupled to the digital selection signal line and configured to receive the digital selection signal from the digital selection signal line. Optionally, the first electrode of the first transistor is coupled to the first digital data signal line and configured to receive the first digital data signal from the first digital data signal line. Optionally, the second electrode of the first transistor is coupled to the latch. Optionally, the first electrode of the second transistor is coupled to the second digital data signal line and configured to receive the second digital data signal from the second digital data signal line. Optionally, the second electrode of the second transistor is coupled to the latch.

Figure 17:
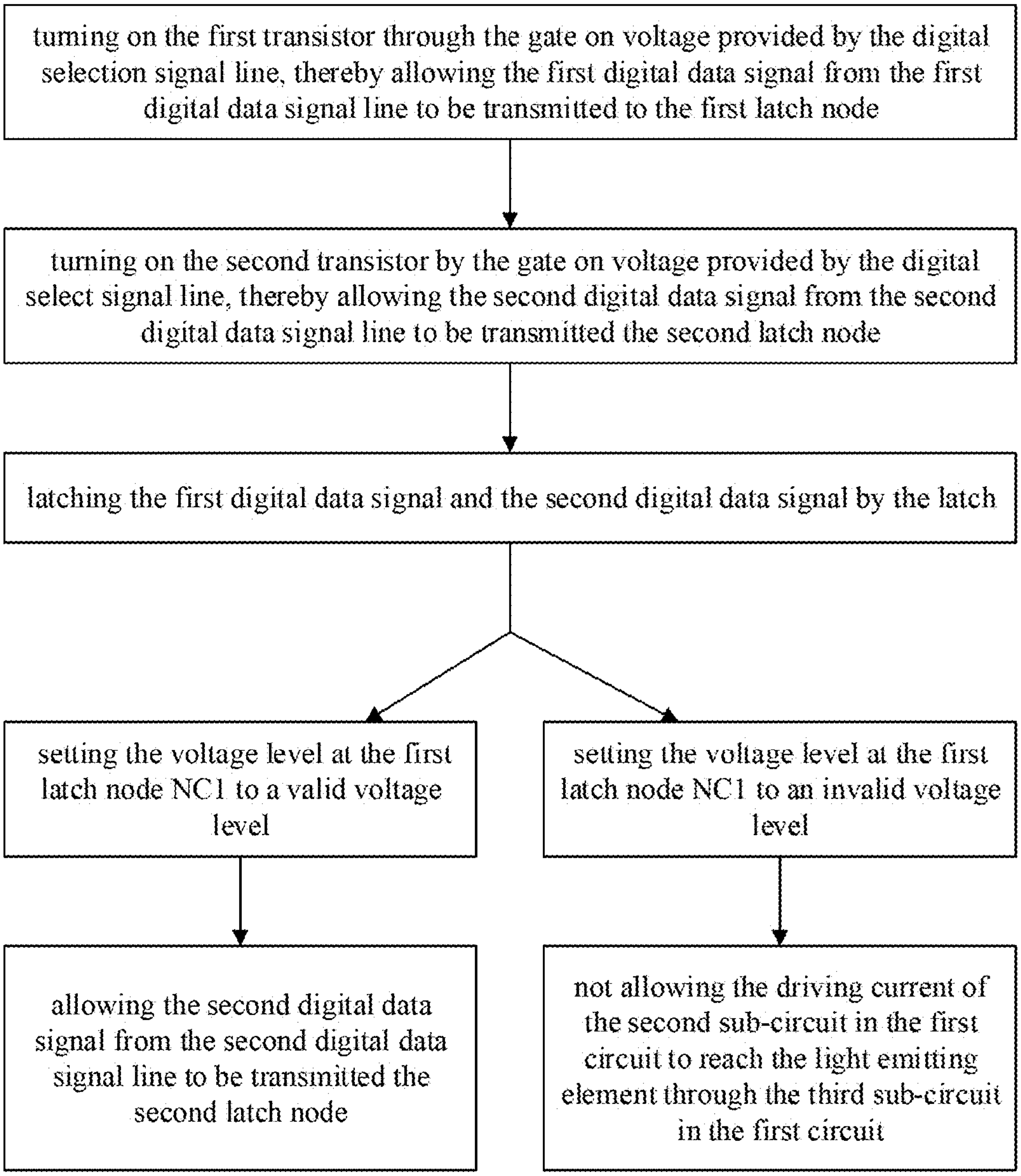
FIG. 17 is a flowchart illustrating a display method in some embodiments of the present disclosure.

FIG. 17 is a flowchart illustrating a display method in some embodiments of the present disclosure. The display method shown in FIG. 17 is applied to the pixel driving circuits in FIG. 2, FIG. 3A, FIG. 3B, FIG. 5A, and FIG. 5B. Referring to FIG. 17, in some embodiments, the display method further includes turning on the first transistor through the gate on voltage provided by the digital selection signal line, thereby allowing the first digital data signal from the first digital data signal line to be transmitted to the first latch node; turning on the second transistor by the gate on voltage provided by the digital select signal line, thereby allowing the second digital data signal from the second digital data signal line to be transmitted the second latch node; and latching the first digital data signal and the second digital data signal by the latch. Optionally, the display method further includes setting the voltage level at the first latch node to a valid voltage level (e.g., a high voltage level), thereby allowing the driving current of the second sub-circuit in the first circuit to reach the light emitting element through the third sub-circuit in the first circuit. Optionally, the display method further includes setting the voltage level at the first latch node to an invalid voltage level (e.g., a low voltage level), thereby not allowing the driving current of the second sub-circuit in the first circuit to reach the light emitting element through the third sub-circuit in the first circuit.

In some embodiments, the display method includes, in a first phase, providing a turn-on voltage signal to a gate electrode of at least one data writing-in transistor through a gate line to turn on the data writing-in transistor and allow data signal provided by the data line passing through the data writing-in transistor to write the data signal into the first node.

In some embodiments, the first sub-circuit includes a first data writing-in transistor and a second data writing-in transistor. Optionally, the first data writing-in transistor is an n-type transistor, and the second data writing-in transistor is a p-type transistor. In some embodiments, the display method includes, in the first phase, providing a turn-on voltage signal (high voltage signal) to the gate electrode of the first data writing-in transistor through the first gate line to turn on the first data writing-in transistor; providing a turn-on voltage signal (low voltage signal) to the gate electrode of the second data writing-in transistor through the second gate line to turn on the second data writing-in transistor; allowing the data signal provided by the data line to pass through the first data writing-in transistor and the second data writing-in transistor to write data signals into the first node.

In some embodiments, the display method further includes, in the second phase, providing the valid voltage of the digital selection signal to the gate electrodes of the first transistor and the second transistor through the digital selection signal line to turn on the first transistor and the second transistor, so as to allow the first digital data signal provided by the first digital data signal line to pass through the first transistor to reach the first latch node, and allow the second digital signal provided by the second digital data signal line to pass through the second transistor to reach the second latch.

In some embodiments, the second circuit includes a latch, a first transistor, and a second transistor. Optionally, the latch includes a third transistor, a fourth transistor, a fifth transistor and a sixth transistor. Optionally, the gate electrodes of the fourth and sixth transistors are coupled to a first latch node in the second circuit, and the first latch node in the second circuit is coupled to a second electrode of the first transistor. Optionally, the gate electrodes of the third transistor and the fifth transistor are coupled to the second latch node, and the second latch node is coupled to the second electrode of the second transistor. Optionally, the second electrodes of the third and fifth transistors are coupled to the first latch node, and the first latch node is coupled to the gate electrodes of the fourth and sixth transistors. Optionally, the second electrodes of the fourth and sixth transistors are coupled to a second latch node in the second circuit, the second latch node is coupled to the gate electrodes of the third and fifth transistors. Optionally, the first electrodes of the third and fourth transistors are coupled to the voltage supply signal line and configured to receive the voltage supply signal from the voltage supply signal line. Optionally, the first electrodes of the fifth and sixth transistors are coupled to the low voltage signal line and configured to receive the low voltage signal from the low voltage signal line.

Figure 18:
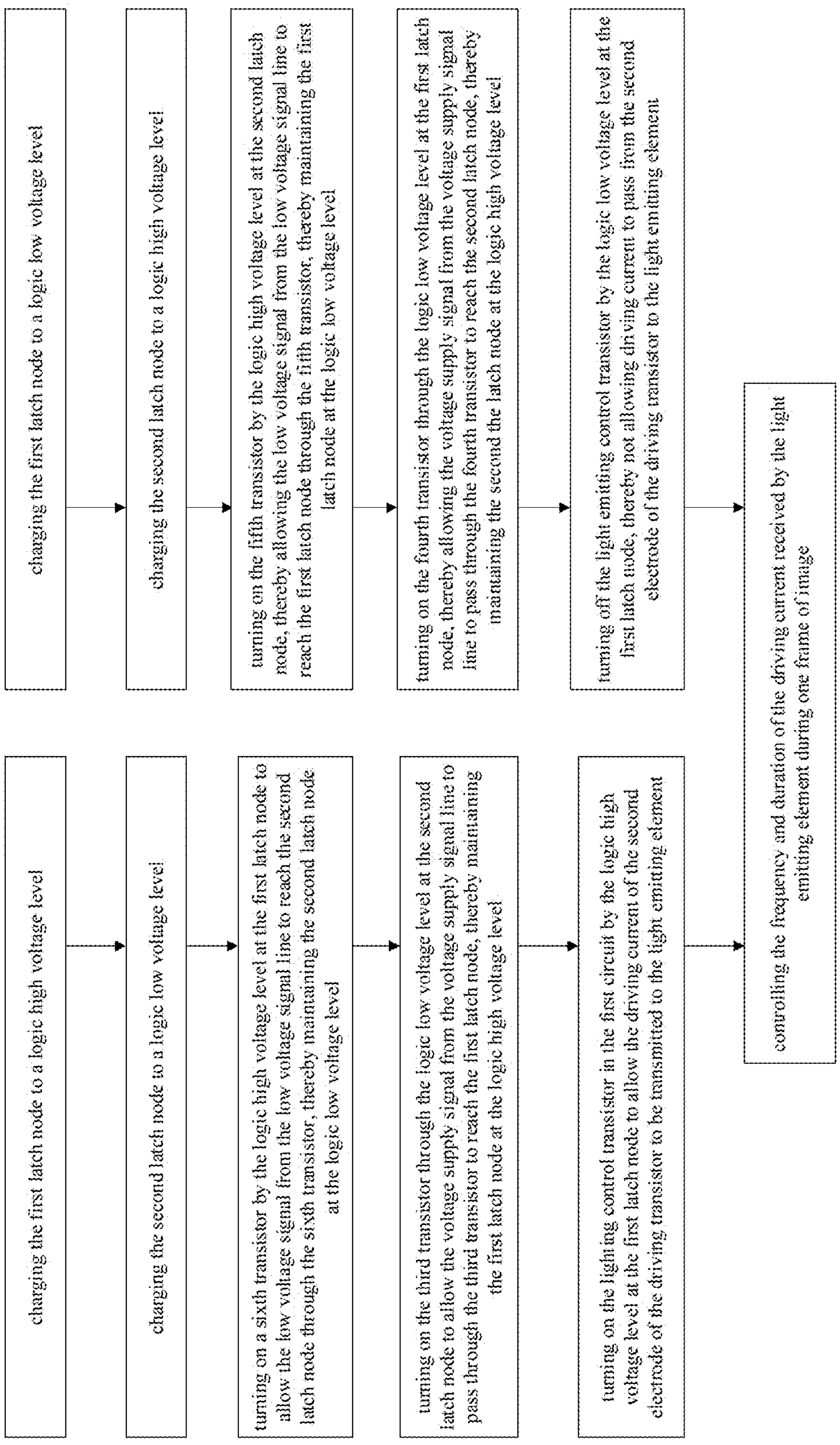
FIG. 18 is a flowchart illustrating a display method in some embodiments of the present disclosure.

FIG. 18 is a flowchart illustrating a display method in some embodiments of the present disclosure. The display method in FIG. 18 can be applied to the pixel driving circuits in FIGS. 3A, 3B, 5A and 5B. Referring to FIG. 18, in some embodiments, controlling the frequency and duration at which the light emitting element receives a driving current during a frame of image includes: charging the first latch node to a logic high voltage level (e.g., "1"); charging the second latch node to a logic low voltage level (e.g., "0"); turning on a sixth transistor by the logic high voltage level at the first latch node to allow the low voltage signal from the low voltage signal line to reach the second latch node through the sixth transistor, thereby maintaining the second latch node at the logic low voltage level; turning on the third transistor through the logic low voltage level at the second latch node to allow the voltage supply signal from the voltage supply signal line to pass through the third transistor to reach the first latch node, thereby maintaining the first latch node at the logic high voltage level; and turning on the lighting control transistor in the first circuit by the logic high voltage level at the first latch node to allow the driving current of the second electrode of the driving transistor to be transmitted to the light emitting element.

In some embodiments, controlling the frequency and duration of the driving current received by the light emitting element during one frame of image further includes: charging the first latch node to a logic low voltage level (e.g., "0"); charging the second latch node to a logic high voltage level (e.g., "1"); turning on the fifth transistor by the logic high voltage level at the second latch node, thereby allowing the low voltage signal from the low voltage signal line to reach the first latch node through the fifth transistor, thereby maintaining the first latch node at the logic low voltage level; turning on the fourth transistor through the logic low voltage level at the first latch node, thereby allowing the voltage supply signal from the voltage supply signal line to pass through the fourth transistor to reach the second latch node, thereby maintaining the second the latch node at the logic high voltage level; and turning off the light emitting control transistor by the logic low voltage level at the first latch node, thereby not allowing driving current to pass from the second electrode of the driving transistor to the light emitting element.

Figure 19:
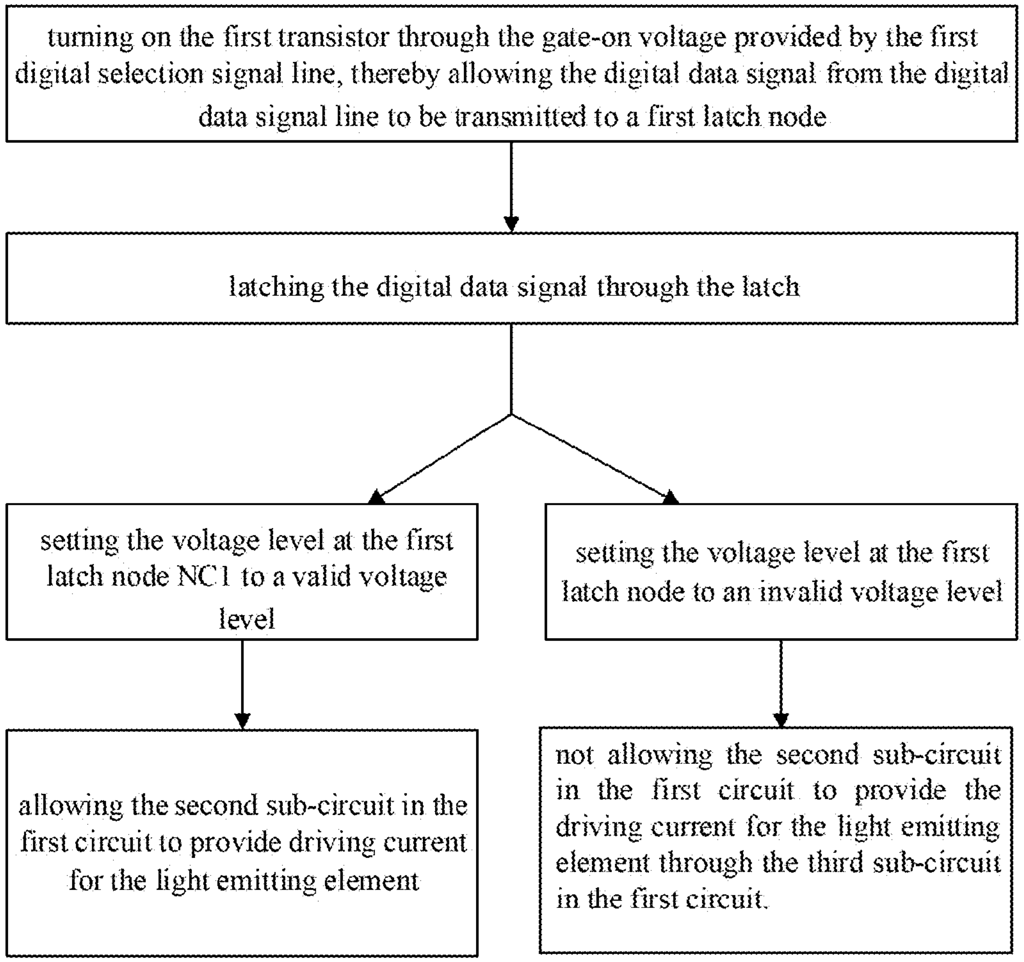
FIG. 19 is a flowchart illustrating a display method in some embodiments of the present disclosure.

FIG. 19 is a flowchart illustrating a display method in some embodiments of the present disclosure. The display method shown in FIG. 19 can be applied to the pixel driving circuits shown in FIGS. 8, 9, 11, and 13. Referring to FIG. 19, in some embodiments, the display method includes: turning on the first transistor through the gate-on voltage provided by the first digital selection signal line, thereby allowing the digital data signal from the digital data signal line to be transmitted to a first latch node; and latching the digital data signal through the latch. Optionally, the display method further includes setting the voltage level at the first latch node to a valid voltage level (e.g., a high voltage level), thereby allowing the second sub-circuit in the first circuit to provide driving current for the light emitting element. Optionally, the display method further includes setting the voltage level at the first latch node to an invalid voltage level (e.g., a low voltage level), thereby not allowing the second sub-circuit in the first circuit to provide the driving current for the light emitting element through the third sub-circuit in the first circuit.

In some embodiments, the display method includes, in a first phase, providing a turn-on voltage signal to a gate electrode of at least one data writing-in transistor through a gate line to turn on the data writing-in transistor and allow data signal provided by the data line to pass through the data writing-in transistor to write the data signal into the first node.

In some embodiments, the pixel driving circuit adopts the structure shown in FIG. 11 or FIG. 13, and the display method includes, in the first phase, providing the turn-on voltage signal (high voltage signal) to the gate electrode of the first data writing-in transistor through the first gate line to turn on the first data writing-in transistor; providing the turn-on voltage signal (low voltage signal) to the gate electrode of the second data writing-in transistor through the second gate line to turn on the second data writing-in transistor; allowing the data signal provided by the data line to pass through the first data writing-in transistor and the second data writing-in transistor respectively to write the data signal to the first node.

In some embodiments, the pixel driving circuit adopts the structure shown in FIG. 11 or FIG. 13, and the display method further includes, in the second phase, providing the valid voltage of the first digital selection signal to the gate electrode of the first transistor through the first digital selection signal line to turn on the first transistor, allowing the digital data signal provided by the digital data signal line to reach the first latch node through the first transistor. When the pixel driving circuit adopts the structure shown in FIG. 13, the display method further includes, in the second phase, providing the valid voltage of the second digital selection signal to the gate electrode of the second transistor through the second digital selection signal line, to turn on the second transistor, allowing the digital data signal provided by the digital data signal line to pass through the second transistor to reach the first latch node.

Figure 20:
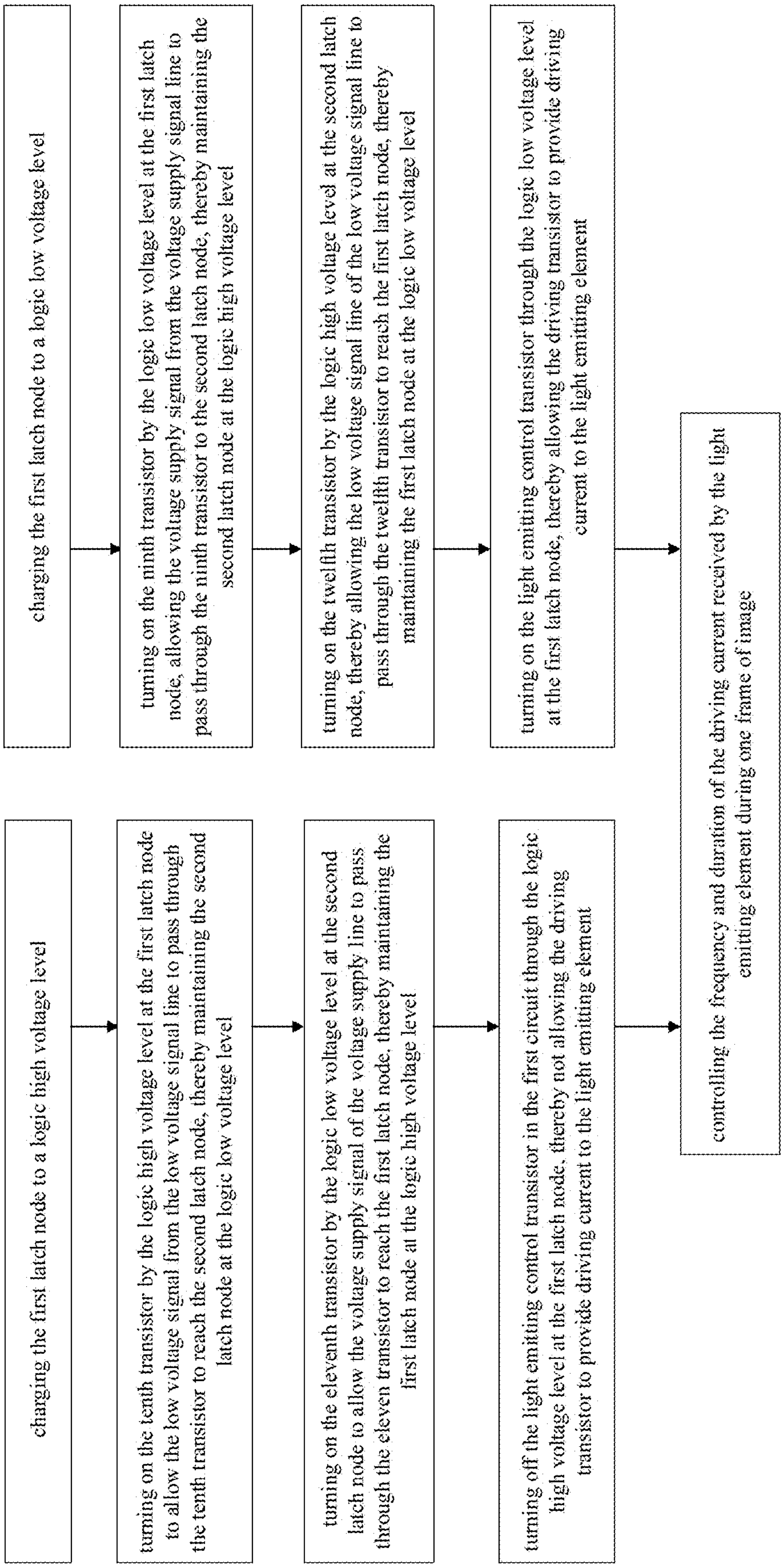
FIG. 20 is a flowchart illustrating a display method in some embodiments of the present disclosure.

FIG. 20 is a flowchart illustrating a display method in some embodiments of the present disclosure. The display method in FIG. 20 can be applied to the pixel driving circuits in FIGS. 9, 11 and 13. Referring to FIG. 20, in some embodiments, controlling the frequency and duration at which the light emitting element receives a driving current during one frame of image includes: charging the first latch node to a logic high voltage level (e.g., "1"); turning on the tenth transistor by the logic high voltage level at the first latch node to allow the low voltage signal from the low voltage signal line to pass through the tenth transistor to reach the second latch node, thereby maintaining the second latch node at the logic low voltage level; turning on the eleventh transistor by the logic low voltage level at the second latch node to allow the voltage supply signal of the voltage supply line to pass through the eleven transistor to reach the first latch node, thereby maintaining the first latch node at the logic high voltage level; and turning off the light emitting control transistor in the first circuit through the logic high voltage level at the first latch node, thereby not allowing the driving transistor to provide driving current to the light emitting element.

In some embodiments, controlling the frequency and duration of the driving current received by the light emitting element during one frame of image further includes: charging the first latch node to a logic low voltage level (e.g., "0"); turning on the ninth transistor by the logic low voltage level at the first latch node, allowing the voltage supply signal from the voltage supply signal line to pass through the ninth transistor to the second latch node, thereby maintaining the second latch node at the logic high voltage level; turning on the twelfth transistor by the logic high voltage level at the second latch node, thereby allowing the low voltage signal line of the low voltage signal line to pass through the twelfth transistor to reach the first latch node, thereby maintaining the first latch node at the logic low voltage level; and turning on the light emitting control transistor through the logic low voltage level at the first latch node, thereby allowing the driving transistor to provide driving current to the light emitting element.

In another aspect, the present disclosure provides a method of manufacturing a pixel driving circuit. In some embodiments, the method includes forming a first circuit and forming a second circuit. Optionally, the first circuit is configured to provide a driving current to the light emitting element under the control of the second circuit. Optionally, the second circuit is configured to: receive a digital selection signal from at least one digital selection signal line, receive a digital data signal from at least one digital data signal line; and control the light emitting element to receive the frequency and duration of the driving current during one frame of image, thereby controlling the grayscale of the sub-pixel having the light emitting element.

The description of embodiments of the present disclosure has been presented for the purposes of illustration and description. It is not intended to be exhaustive or to limit the present disclosure to the precise forms or exemplary embodiments. Accordingly, the description should be considered illustrative rather than restrictive. Obviously, many modifications and variations will be apparent to those skilled in the art. The embodiment was chosen and described in order to explain the principles of the present disclosure and its best mode practical application, thereby enabling others skilled in the art to understand the present disclosure for various embodiments and with the various modifications as are suited to the particular use or implementation. The scope of the present disclosure is intended to be defined by the appended claims and their equivalents, in which all terms are meant in their broadest reasonable meaning unless otherwise indicated. Accordingly, the terms "the present disclosure" and the like do not necessarily limit the scope of the claims to the specific embodiments, and references to exemplary embodiments of the present disclosure do not imply limitations on the present disclosure and should not be inferred such restrictions. The present disclosure is limited only by the spirit and scope of the appended claims. Additionally, these claims may involve the use of "first," "second," etc., followed by the noun or element. These terms should be understood as nomenclature and should not be construed as limiting the number of elements modified by these nomenclatures unless a specific number has been given. Any advantages and benefits described may not apply to all embodiments of the present disclosure. It will be understood that changes to the described embodiments may be made by those skilled in the art without departing from the scope of the present disclosure as defined by the appended claims. Furthermore, elements and components of the present disclosure are not dedicated to the public, whether or not the elements or components are expressly recited in the appended claims.

What is claimed is:

1. A pixel driving circuit, comprising a first circuit and a second circuit, wherein the first circuit is configured to provide a driving current to a light emitting element under a control of the second circuit, wherein the second circuit is configured to:

receive a digital selection signal from at least one digital selection signal line, receive a digital data signal from at least one digital data signal line, and control a frequency and duration of the driving current received by the light emitting element during one frame of image, thereby controlling a grayscale of a sub-pixel having the light emitting element, wherein:

the second circuit includes a latch, a first transistor and a second transistor;

the latch includes a third transistor, a fourth transistor, a fifth transistor and a sixth transistor;

gate electrodes of the fourth transistor and the sixth transistor are coupled to a first latch node in the second circuit, and the first latch node is coupled to a second electrode of the first transistor;

gate electrodes of the third transistor and the fifth transistor are coupled to a second latch node, and the second latch node is coupled to a second electrode of the second transistor;

second electrodes of the third transistor and the fifth transistor are coupled to the first latch node, and the first latch node is coupled to gate electrodes of the fourth transistor and the sixth transistor;

second electrodes of the fourth transistor and the sixth transistor are coupled to the second latch node in the second circuit, the second latch node is coupled to the gate electrode of the third transistor and the gate electrode of the fifth transistor;

first electrodes of the third transistor and the fourth transistor are coupled to a voltage supply signal line and configured to receive a voltage supply signal from the voltage supply signal line;

first electrodes of the fifth transistor and the sixth transistor are coupled to a low voltage signal line and configured to receive a low voltage signal from the low voltage signal line, the second circuit further includes a seventh transistor and an eighth transistor;

gate electrodes of the seventh transistor and the eighth transistor are coupled to the first latch node;

second electrodes of the seventh transistor and the eighth transistor are coupled to the gate electrode of the light emitting control transistor in the first circuit;

a first electrode of the seventh transistor is coupled to the voltage supply signal line; and a first electrode of the eighth transistor is coupled to the low voltage signal line.

2. The pixel driving circuit according to claim 1, wherein the at least one digital data signal line includes a first digital data signal line and a second digital data signal line; the second circuit includes a latch, a first transistor and a second transistor;

gate electrodes of the first transistor and the second transistor are coupled to the digital selection signal line and configured to receive the digital selection signal from the digital selection signal line;

a first electrode of the first transistor is coupled to the first digital data signal line and configured to receive a first digital data signal from the first digital data signal line;

a second electrode of the first transistor is coupled to the latch;

a first electrode of the second transistor is coupled to the second digital data signal line and configured to receive a second digital data signal from the second digital data signal line; and a second electrode of the second transistor is coupled to the latch.

3. The pixel driving circuit according to claim 1, wherein the at least one digital selection signal line includes a first digital selection signal line; the second circuit includes a latch and a first transistor;

a gate electrode of the first transistor is coupled to the first digital selection signal line and is configured to receive a first digital selection signal from the first digital selection signal line;

a first electrode of the first transistor is coupled to the digital data signal line and configured to receive the digital data signal from the digital data signal line;

a second electrode of the first transistor is coupled to the latch, wherein the at least one digital selection signal line further includes a second digital selection signal line; the second circuit further includes a second transistor;

a gate electrode of the second transistor is coupled to the second digital selection signal line and is configured to receive a second digital selection signal from the second digital selection signal line;

a first electrode of the second transistor is coupled to the digital data signal line and configured to receive the digital data signal from the digital data signal line;

a second electrode of the second transistor is coupled to the latch, wherein the latch includes: a ninth transistor, a tenth transistor, an eleventh transistor and a twelfth transistor;

gate electrodes of the ninth transistor and the tenth transistor are coupled to a first latch node in the second circuit, and the first latch node is coupled to a second electrode of the first transistor;

a first electrode of the ninth transistor and a first electrode of the eleventh transistor are coupled to the voltage supply signal line, and a second electrode of the ninth transistor is coupled to a second electrode of the tenth transistor, and coupled to a gate electrode of the eleventh transistor and a gate electrode of the twelfth transistor;

a second electrode of the eleventh transistor is coupled to a second electrode of the twelfth transistor and coupled to the first latch node;

a first electrode of the tenth transistor and a first electrode of the twelfth transistor are coupled to a low voltage signal line and configured to receive a low voltage signal from the low voltage signal line.

4. The pixel driving circuit according to claim 1, wherein the first circuit includes a first sub-circuit, a second sub-circuit and a third sub-circuit;

the third sub-circuit is coupled to the second sub-circuit, to the light emitting element, and to a first latch node in the second circuit; and a voltage level at the first latch node is configured to control the third sub-circuit to allow or disallow the driving current from the second sub-circuit to pass through the third sub-circuit to reach the light emitting element.

5. The pixel driving circuit according to claim 1, wherein, the first circuit includes a storage capacitor, a first sub-circuit, a second sub-circuit and a third sub-circuit;

the first sub-circuit is coupled to a data line and a gate line and is configured to write a data signal to a first node;

the second sub-circuit is coupled to the first node and configured to receive a voltage supply signal from a voltage supply signal line; and the second sub-circuit is coupled to the first sub-circuit and to the third sub-circuit;

a first electrode of the storage capacitor is coupled to the first node.

6. The pixel driving circuit according to claim 1, wherein the first circuit includes a storage capacitor, a first sub-circuit, a second sub-circuit and a third sub-circuit;

the first sub-circuit includes at least one data writing-in transistor;

the second sub-circuit includes a driving transistor;

the third sub-circuit includes a light emitting control transistor;

a gate electrode of the light emitting control transistor is coupled to the first latch node in the second circuit;

a first electrode of the light emitting control transistor is coupled to the second electrode of the driving transistor; and a second electrode of the light emitting control transistor is coupled to an anode of the light emitting element.

7. The pixel driving circuit according to claim 6, wherein a gate electrode of the data writing-in transistor is coupled to the gate line;

a first electrode of the data writing-in transistor is coupled to the data line;

a second electrode of the data writing-in transistor coupled to the first node;

a gate electrode of the driving transistor is coupled to the first node;

a first electrode of the driving transistor is coupled to the voltage supply signal line; and a second electrode of the driving transistor is coupled to the first electrode of the light emitting control transistor.

8. The pixel driving circuit according to claim 6, wherein the first circuit further includes a control transistor;

a gate electrode of the control transistor is coupled to the gate line, a first electrode of the control transistor is coupled to the voltage supply signal line, and a second electrode of the control transistor is coupled to the first electrode of the driving transistor, wherein the first circuit further includes an auxiliary capacitor;

a first electrode of the storage capacitor is coupled to the first node, a second electrode of the storage capacitor is coupled to a second electrode of the auxiliary capacitor, the first electrode of the driving transistor and a second electrode of the control transistor; and a first electrode of the auxiliary capacitor is coupled to the voltage supply signal line, and the second electrode of the auxiliary capacitor is coupled to the second electrode of the storage capacitor, the first electrode of the driving transistor and the second electrode of the control transistor.

9. The pixel driving circuit according to claim 1, wherein the first circuit includes a storage capacitor, a first sub-circuit, a second sub-circuit and a third sub-circuit;

the first sub-circuit includes a first data writing-in transistor and a second data writing-in transistor;

the first data writing-in transistor is an n-type transistor, and the second data writing-in transistor is a p-type transistor;

a gate electrode of the first data writing-in transistor is coupled to a first gate line and configured to receive a first gate driving signal from the first gate line;

a gate electrode of the second data writing-in transistor is coupled to a second gate line and configured to receive a second gate driving signal from the second gate line;

first electrodes of the first data writing-in transistor and the second data writing-in transistor are coupled to the data line; and second electrodes of the first data writing-in transistor and the second data writing-in transistor are coupled to the first node.

10. The pixel driving circuit according to claim 1, wherein, the first circuit includes a storage capacitor, a first sub-circuit, a second sub-circuit and a third sub-circuit;

the first sub-circuit is coupled to a first node and configured to write a data signal on a data line into a first node;

the second sub-circuit is coupled to the first node and the light emitting element;

the third sub-circuit is coupled to the second sub-circuit, to a voltage supply signal line, and to a first latch node in the second circuit; and the voltage level at the first latch node is configured to control the third sub-circuit to allow or disallow the second sub-circuit to provide a driving current to the light emitting element;

a first electrode of the storage capacitor is coupled to the first node.

11. The pixel driving circuit according to claim 10, wherein, the first sub-circuit includes at least one data writing-in transistor;

the second sub-circuit includes a driving transistor, a gate electrode of the driving transistor is coupled to the first node, and a second electrode of the driving transistor is coupled to an anode of the light emitting element;

the third sub-circuit includes a light emitting control transistor, a gate electrode of the light emitting control transistor is coupled to the first latch node in the second circuit, and a first electrode of the light emitting control transistor is coupled to the a voltage supply signal line, and a second electrode of the light emitting control transistor is coupled to the first electrode of the driving transistor, the at least one data writing-in transistor includes a first data writing-in transistor and a second data writing-in transistor;

the first data writing-in transistor is an n-type transistor, and the second data writing-in transistor is a p-type transistor;

a gate electrode of the first data writing-in transistor is coupled to a first gate line and configured to receive a first gate driving signal from the first gate line;

a gate electrode of the second data writing-in transistor is coupled to a second gate line and configured to receive a second gate driving signal from the second gate line;

first electrodes of the first data writing-in transistor and the second data writing-in transistor are coupled to the data line; and second electrodes of the first data writing-in transistor and the second data writing-in transistor are coupled to the first node.

12. The pixel driving circuit according to claim 1, wherein a frequency and duration of the driving current received by the light emitting element during a one frame of image are related to a frequency and duration of a valid voltage of the digital selection signal provided to the digital selection signal line during the one frame of image.

13. A display device, comprising: a plurality of light emitting elements arranged in an array;

wherein each light emitting element is in a sub-pixel;

the sub-pixel is connected to the pixel driving circuit according to claim 1; and each light emitting element is a mini-light emitting diode or a micro-light emitting diode, wherein the pixel driving circuit is located on a silicon-based substrate.

14. A display method, comprising:

providing a pixel driving circuit including a first circuit and a second circuit;

providing, by the first circuit, a driving current to the light emitting element under a control of the second circuit;

receiving, by the second circuit, a digital selection signal from at least one digital selection signal line and receiving a digital data signal from at least one digital data signal line; and controlling, by the second circuit, a frequency and duration of the driving current received by the light emitting element during one frame of image, thereby controlling a gray scale of a sub-pixel having the light emitting element, wherein:

the second circuit includes a latch, a first transistor and a second transistor;

the latch includes a third transistor, a fourth transistor, a fifth transistor and a sixth transistor;

gate electrodes of the fourth transistor and the sixth transistor are coupled to a first latch node in the second circuit, and the first latch node is coupled to a second electrode of the first transistor;

gate electrodes of the third transistor and the fifth transistor are coupled to a second latch node, and the second latch node is coupled to a second electrode of the second transistor;

second electrodes of the third transistor and the fifth transistor are coupled to the first latch node, and the first latch node is coupled to gate electrodes of the fourth transistor and the sixth transistor;

second electrodes of the fourth transistor and the sixth transistor are coupled to the second latch node in the second circuit, the second latch node is coupled to the gate electrode of the third transistor and the gate electrode of the fifth transistor;

first electrodes of the third transistor and the fourth transistor are coupled to a voltage supply signal line and configured to receive a voltage supply signal from the voltage supply signal line;

first electrodes of the fifth transistor and the sixth transistor are coupled to a low voltage signal line and configured to receive a low voltage signal from the low voltage signal line;

the second circuit further includes a seventh transistor and an eighth transistor;

gate electrodes of the seventh transistor and the eighth transistor are coupled to the first latch node;

second electrodes of the seventh transistor and the eighth transistor are coupled to the gate electrode of the light emitting control transistor in the first circuit;

a first electrode of the seventh transistor is coupled to the voltage supply signal line; and a first electrode of the eighth transistor is coupled to the low voltage signal line.

15. The display method according to claim 14, wherein the second circuit includes a latch, a first transistor and a second transistor;

gate electrodes of the first transistor and the second transistor are coupled to the digital selection signal line and configured to receive a digital selection signal from the digital selection signal line;

a first electrode of the first transistor is coupled to the first digital data signal line and configured to receive a first digital data signal from the first digital data signal line;

a second electrode of the first transistor is coupled to the latch;

a first electrode of the second transistor is coupled to the second digital data signal line and configured to receive a second digital data signal from the second digital data signal line; and a second electrode of the second transistor is coupled to the latch;

wherein the display method also includes:

turning on the first transistor by a gate on voltage provided by the digital select signal line, thereby allowing the first digital data signal from the first digital data signal line to be transmitted to the first latch node;

turning on the second transistor by the gate on voltage provided by the digital select signal line, thereby allowing the second digital data signal from the second digital data signal line to be transmitted to the second latch node; and latching the first digital data signal and the second digital data signal by the latch.

16. The display method according to claim 14, wherein the at least one digital selection signal line includes a first digital selection signal line; the second circuit includes a latch and a first transistor;

a gate electrode of the first transistor is coupled to the digital selection signal line and is configured to receive a digital selection signal from the digital selection signal line;

a first electrode of the first transistor is coupled to the digital data signal line and configured to receive the digital data signal from the digital data signal line;

a second electrode of the first transistor is coupled to the latch;

wherein the display method also includes:

turning on the first transistor by a gate on voltage provided by the first digital selection signal line, thereby allowing a digital data signal from the digital data signal line to be transmitted to the first latch node;

latching the digital data signal by the latch.

17. The display method according to claim 14, wherein the at least one digital selection signal line further includes a second digital selection signal line; the second circuit further includes a second transistor;

wherein a gate electrode of the second transistor is coupled to the second digital selection signal line and is configured to receive a second digital selection signal from the second digital selection signal line;

a first electrode of the second transistor is coupled to the digital data signal line and configured to receive the digital data signal from the digital data signal line;

a second electrode of the second transistor is coupled to the latch;

wherein the display method also includes:

turning on the second transistor by the gate on voltage provided by the second digital selection signal line, thereby allowing the digital data signal from the digital data signal line to be transmitted to the first latch node.

18. The display method according to claim 14, further comprising:

setting a voltage level at the first latch node to a valid voltage level; and allowing the driving current from the second sub-circuit in the first circuit to pass through the third sub-circuit in the first circuit to reach the light emitting element;

or setting the voltage level at the first latch node to an invalid voltage level; and disallowing the driving current from the second sub-circuit in the first circuit to pass through the third sub-circuit in the first circuit to reach the light emitting element;

or in the first phase, providing a turn-on voltage signal to at least a gate electrode of the data writing-in transistor through a gate line to turn on the data writing-in transistor, allowing a data signal provided by the data line to pass through the data writing-in transistor to write the data signal into the first node.

19. The display method according to claim 14, wherein the first sub-circuit includes a first data writing-in transistor and a second data writing-in transistor;

the display method also includes, in the first phase, providing a turn-on voltage signal to the gate electrode of the first data writing-in transistor through the first gate line to turn on the first data writing-in transistor;

providing a turn-on voltage signal to the gate electrode of the second data writing-in transistor through the second gate line to turn on the second data writing-in transistor; and allowing the data signal provided by the data line to pass through the first data writing-in transistor and the second data writing-in transistor respectively to write the data signal into the first node.

* * * * *